United States Patent

Matsumoto

[11] Patent Number: 5,977,732
[45] Date of Patent: Nov. 2, 1999

[54] APPARATUS AND METHOD FOR DETERMINING PRESENCE OR ABSENCE OF FOREIGN OBJECT OR THE LIKE CAUGHT IN POWER-OPEN-AND-CLOSURE MECHANISM

[75] Inventor: Takashi Matsumoto, Yokohama, Japan

[73] Assignee: Nissan Motor Co., Ltd., Kanagawa, Japan

[21] Appl. No.: 09/018,345

[22] Filed: Feb. 4, 1998

[30] Foreign Application Priority Data

Feb. 4, 1997 [JP] Japan .................................. 9-035641
Mar. 10, 1997 [JP] Japan .................................. 9-072636

[51] Int. Cl.$^6$ .................................................... H02P 7/00
[52] U.S. Cl. ........................ 318/283; 318/456; 318/466; 318/434; 49/28
[58] Field of Search .................................. 318/432, 434, 318/280–286, 560–618, 466–470, 456; 49/26, 28

[56] References Cited

U.S. PATENT DOCUMENTS

| | | | |
|---|---|---|---|
| 4,899,063 | 2/1990 | Suck | 318/293 |
| 5,418,440 | 5/1995 | Sakaguchi et al. | 318/560 |
| 5,537,013 | 7/1996 | Toyozumi et al. | 318/283 |
| 5,662,491 | 9/1997 | Antilla et al. | 439/342 |
| 5,663,620 | 9/1997 | Mizuno et al. | 318/283 |
| 5,669,181 | 9/1997 | Kollar et al. | 49/360 |

FOREIGN PATENT DOCUMENTS 6-253570  9/1994  Japan .

*Primary Examiner*—David Martin
*Attorney, Agent, or Firm*—McDermott, Will & Emery

[57] ABSTRACT

Disclosed are apparatus and method for determining whether a foreign object or the like is caught in an open-and-closure mechanism such as a power window of an automotive vehicle. An external disturbance torque T imposed on a the open-and-closure mechanism motor as its load is calculated on the basis of at least two of three parameters of a terminal voltage Em across the motor, a current flowing through the motor Im, and a motor angular velocity ω. Furthermore, the calculated external disturbance torque is differentiated to derive a change rate at which the external disturbance torque T is changed with time as dT/dt (T'). Since dT/dt (T')=dTs'/dt (Ts')+dTd'/dt (Td') and dTd/dt (Td')=0 (Td: a dynamic friction resistance force and dTd/dt: the change rate of the dynamic friction resistance force per time), dT/dt=dTs'/dt (Ts: an external disturbance force imposed on the motor by the caught foreign object and dTs/dt (Ts'): the differentiation value of the external disturbance force). When the change rate (dT/dt or T') of the external disturbance torque T is compared with a predetermined threshold value (Kw in a second embodiment), an accurate determination of whether the foreign object or the like is caught in the open-and-closure mechanism can be made since an aged deterioration and/or a temperature variation in the dynamic friction resistance Td are almost not included in the change rate (dT/dt, T') at which the external disturbance torque T is changed with time.

20 Claims, 11 Drawing Sheets

FIG.6
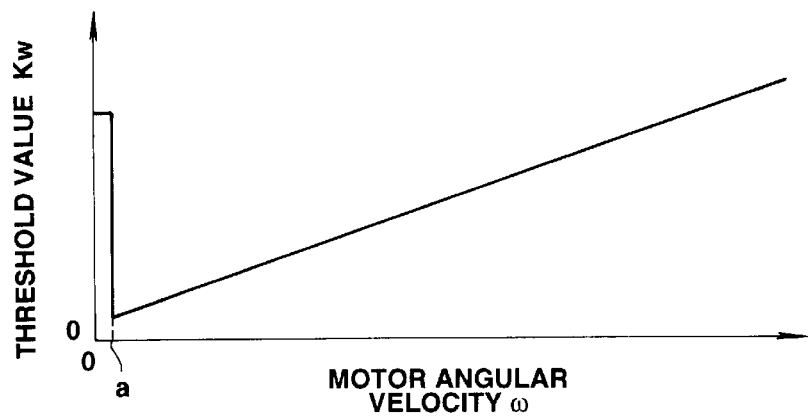
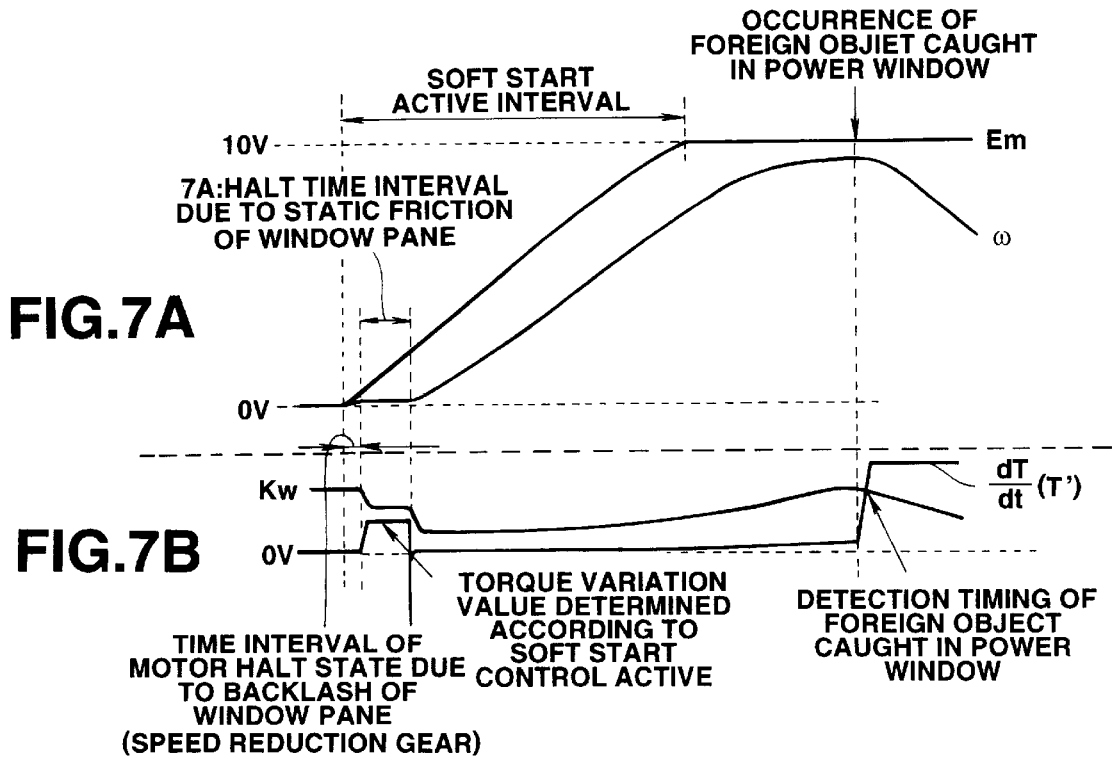
FIG.7A
FIG.7B

APPARATUS AND METHOD FOR DETERMINING PRESENCE OR ABSENCE OF FOREIGN OBJECT OR THE LIKE CAUGHT IN POWER-OPEN-AND-CLOSURE MECHANISM The contents of Applications No. Heisei 9-35641, filing date of Feb. 4, 1997 in Japan and Heisei 9-72636, filing date of Mar. 10, 1997 in Japan are herein incorporated by reference.

BACKGROUND OF THE INVENTION a) Field of the Invention

The present invention relates to apparatus and method for determining a presence or absence of a foreign object or the like is caught in a power open-and-closure mechanism such as a power window installed on an automotive vehicle, a power sun roof installed on a ceiling of a passenger compartment of the automotive vehicle, a power door closure mechanism, or the like without using a special-purpose sensor such as a torque sensor.

b) Description of the Related Art

A Japanese Patent Application First Publication No. Heisei 6-253570 published on Sep. 9, 1994 exemplifies a previously proposed motor control apparatus for a power open-and-closure mechanism which can determine whether a foreign object or the like is caught in the power open-and-closure mechanism.

In the above-identified Japanese Patent Application First Publication, an external motor disturbance force imposed on a motor as a load and generated due to a foreign object such as a human body or the like being caught in the power open-and-closure mechanism (hereinafter, referred simply to as an external disturbance force) is calculated from a motor drive current and a motor terminal voltage in addition to a motor angular acceleration.

Then, on the basis of the calculated external disturbance force imposed on the motor, the current flowing through the motor is controlled by means of a chopper operation using PWM (Pulse Width Modulation) pulses through a, so-called, H bridge drive circuit constituted by four cross-coupled semiconductor switching devices in such a way that the external disturbance force is reduced when an application of the external disturbance force to the motor driving the power open-and-closure mechanism occurs. Consequently, the foreign object or the like can be prevented from being continued to be caught in the power open-and-closure mechanism at a low cost.

SUMMARY OF THE INVENTION

In the previously proposed motor control apparatus for the power open-and-closure mechanism such as a power window described in the BACKGROUND OF THE INVENTION in a case where a window glass (hereinafter, also referred to as a window pane) of the power window of an automotive vehicular door is moved in a direction toward an opposing window frame to a closed position or in a direction away from an upper part of the window frame, a motor torque Tm (a revolving force generated from the motor) is calculated from the motor current Im or from the motor terminal voltage Em and the motor angular velocity $\omega$.

Then, a viscosity resistance Tn proportional to the motor angular velocity $\omega$, a predetermined dynamic friction resistance Td, and an inertia moment of the motor with the motor angular acceleration $d\omega/dt$ (or $\omega'$) taken into consideration are subtracted from the motor torque Tm to derive the external disturbance force Ts.

The derived external disturbance force Ts is compared with a predetermined threshold value so as to determine whether the foreign object or the like is caught in the power open-and-closure mechanism such as the power window.

Since the dynamic friction resistance Td is varied with time as an aged deterioration thereof and varied with a variation in temperature due to a temperature dependent characteristic thereof, calculation errors in the calculation of the external disturbance force Ts are increased.

Next, an influence of the aged deterioration and temperature variation in the dynamic friction resistance on the calculation of the external disturbance force Ts will be described below.

A basic theory of determination of the external disturbance force will also be described below.

That is to say, the motor torque Tm is calculated from a motor constant K1 and the motor current Im as follows:

$$Tm = K1 \times Im \tag{1}$$

As an alternative of the equation (1), the motor torque Tm is calculated from a motor impedance Z, the motor constant K1, and the motor terminal voltage Em as follows:

$$Tm = [Em - (K1 \times \omega)] \times K1/Z \tag{2}$$

Hence, the motor torque Tm can be derived from the motor current Im or from the motor terminal voltage Em and the motor angular velocity $\omega$.

The viscosity resistance Tn is proportional to the motor angular velocity $\omega$ and is calculated from a viscosity resistance coefficient K2 as follows:

$$Tn = K2 \times \omega \tag{3}$$

It is noted that the value of the viscosity resistance Tn calculated using the viscosity resistance coefficient K2 is negligibly small as compared with the external disturbance force Ts. Hence, the error in the calculation of the external disturbance force Ts is not augmented even if the viscosity resistance coefficient K2 is varied with time as its aged deterioration and is varied with a temperature variation.

Next, the inertia moment Tk of the motor is calculated from the motor angular acceleration $d\omega/dt$ ($\omega'$) and an inertia moment M of a whole drive system for the power window as follows:

$$Tk = M \times d\omega/dt (Tk = M \times \omega) \tag{4}$$

It is understood that the motor angular acceleration $d\omega/dt$ ($\omega'$) can be derived by differentiating the motor angular velocity $\omega$.

As shown in the equation (4), the inertia moment Tk of the motor can be derived from the motor angular acceleration $d\omega/dt$ ($\omega'$).

Since the motor torque Tm is always balanced with the viscosity resistance Tn, the dynamic friction resistance Td, the inertia moment Tk, and the external disturbance torque Ts, the following equation (5) is established.

$$Tm = Tn + Td + Tk + Ts \tag{5}$$

The external disturbance force Ts is, thus, derived according to the following equation (6) or (7) using the equations (1) through (5). Thereafter, the determination of whether the foreign object or the like is caught in the power window is carried out by the comparison of the external disturbance force Ts with a predetermined threshold value.

$$Ts = K1/Z \times Em - [K1 \times K1/(Z+K2)] \times \omega - M \times d\omega/dt - Td \qquad (6).$$

$$Ts = K1 \times Im - K2 \times \omega - M \times d\omega/dt - Td \qquad (7).$$

As appreciated from the equations (6) and (7), the external disturbance force Ts can be derived from the motor terminal voltage Em or the motor current Im, the motor angular velocity Co, the motor angular acceleration $d\omega/dt$ ($\omega'$), and the dynamic friction resistance Td. However, unless the variation with time as the aged deterioration on the dynamic friction resistance Td and the temperature variation thereof Td are converged into their constant values, the error in the calculation of the external disturbance force Ts is augmented.

To solve the above-described calculation error, such a method that the dynamic friction resistance value at the time when no catch of the foreign object or the like in the power window is assured is stored, corrected, and updated in a memory unit has been proposed. However, in a case where the above-described method is applied to an automotive vehicle, it becomes problematic in what way a reference slide resistance required to correct the dynamic friction resistance value should be sampled (hereinafter, referred to as an initialize).

When the initialize is executed, there is a restriction that the window pane of the power window is raised or lowered to or from the upper part of the window frame at least with no any other force than the external disturbance force imposed on the windowpane. In addition, when the initialize is tried to be carried out during the running of the vehicle, an inertia force due to vibrations developed from a road surface on which the vehicle is running is acted upon the window pane, a vehicular occupant touches the window pane, and/or an unnecessary friction force is acted upon the window pane. Consequently, there is a possibility that an erroneous reference slide resistance is sampled.

Therefore, the initialize needs to be carried out during a shipment of the vehicle or during a regular vehicular check service such as a regular inspection of the vehicle. Alternatively, a vehicle manufacturer informs a vehicle user of the execution of the initialize or requests the vehicle user to regularly execute the initialize without failure, for the purpose of safety drive of the vehicle.

It is therefore an object of the present invention to provide apparatus and method for determining whether a foreign object or the like is caught in a power open-and-closure mechanism such as a power window or the like which can at least accurately determine the external disturbance force exerted on the caught foreign object or the like and imposed on the motor as a load on the motor even if the dynamic friction resistance is varied with time as its aged deterioration and/or varied with its temperature variation, can eliminate an operation for the initialize, and can positively drive the power open-and-closure mechanism to move in the direction to the open position when the foreign object or the like has been determined to be caught in the power open-and-closure mechanism.

The above-described object can be achieved by providing an apparatus for a power open-and-closure mechanism, comprising: a fixed member of the power open-and-closure mechanism; a movable member of the power open-and-closure mechanism; a reversible motor, in response to a receipt of a power supply, for driving the power open-and-closure mechanism to move the movable member in directions toward the fixed member to a closed position and away from the fixed member to an open position; a current detector for detecting a current flowing through the reversible motor; a voltage detector for detecting a terminal voltage across the reversible motor; a motor angular velocity detector for detecting an angular velocity of the reversible motor; an external disturbance torque calculator for calculating an external disturbance torque imposed on the reversible motor as its load on the basis of at least two of three parameters of the detected current flowing through the reversible motor, the detected terminal voltage across the reversible motor, and the detected angular velocity of the reversible motor; a differentiator for differentiating the calculated external disturbance torque to derive a change rate at which the calculated external disturbance torque is changed with time; and, a comparator for comparing the derived change rate of the calculated external disturbance torque with a predetermined threshold value so as to determine whether a foreign object or the like is caught in the power open-and-closure mechanism on the basis of a result of comparison thereby while the movable member is driven by the reversible motor to be moved in the direction toward the fixed member to the closed position.

The above-described object can also be achieved by providing an apparatus for a power open-and-closure mechanism, comprising: a fixed member of the power open-and-closure mechanism; a movable member of the power open-and-closure mechanism; a reversible motor, in response to a receipt of a power supply, for driving the power open-and-closure mechanism to move the movable member in directions toward the fixed member to a closed position and away from the fixed member to an open position; current detecting means for detecting a current flowing through the reversible motor; voltage detecting means for detecting a terminal voltage across the reversible motor; motor angular velocity detecting means for detecting an angular velocity of the reversible motor; external disturbance torque calculating means for calculating an external disturbance torque imposed on the reversible motor as its load on the basis of at least two of three parameters of the detected current flowing through the reversible motor, the detected terminal voltage across the reversible motor, and the detected angular velocity of the reversible motor; differentiating means for differentiating the calculated external disturbance torque to derive a change rate at which the calculated external disturbance torque is changed with time; and, comparing means for comparing the derived change rate of the calculated external disturbance torque with a predetermined threshold value so as to determine whether a foreign object or the like is caught in the power open-and-closure mechanism on the basis of a result of comparison thereby while the movable member is driven by the reversible motor to be moved in the direction toward the fixed member to the closed position.

The above-described object can also be achieved by providing a method for determining whether a foreign object or the like is caught in a power open-and-closure mechanism, the open-and-closure mechanism including a fixed member, a movable member, and a motor, in response to a receipt of a power supply, for driving the power open-and-closure mechanism to move the movable member in directions toward the fixed member to a closed position and away from the fixed member to an open position, the method comprising the steps of: detecting a current flowing through the reversible motor; detecting a terminal voltage across the reversible motor; detecting an angular velocity of the motor; calculating an external disturbance torque imposed on the motor as its load on the basis of at least two of three parameters of the detected current flowing through the motor, the detected terminal voltage across the motor, and the detected angular velocity of the motor; differentiating the calculated external disturbance torque to derive a change rate at which the calculated external disturbance torque is changed with time; comparing the derived change rate of the calculated external disturbance torque with a predetermined threshold value; and, determining whether the foreign object or the like is caught in the power open-and-closure mechanism on the basis of a result of comparison at the comparing step while the movable member is driven by the motor to be moved in the direction toward the fixed member to the closed position.

BRIEF DESCRIPTION OF THE DRAWINGS

FIG. 6 is a characteristic graph representing a relationship between a predetermined threshold value (Kw) and a motor angular velocity (ω) in the case of the second embodiment shown in FIG. 5.

FIGS. 7A and 7B are integrally a voltage waveform chart from a motor drive start to a determination that the foreign object or the like is caught in the power window in the case of the second embodiment shown in FIG. 5.

BEST MODE FOR CARRYING OUT THE INVENTION

Reference will hereinafter be made to the drawings in order to facilitate a better understanding of the present invention.

(First Embodiment)

Figure 1:
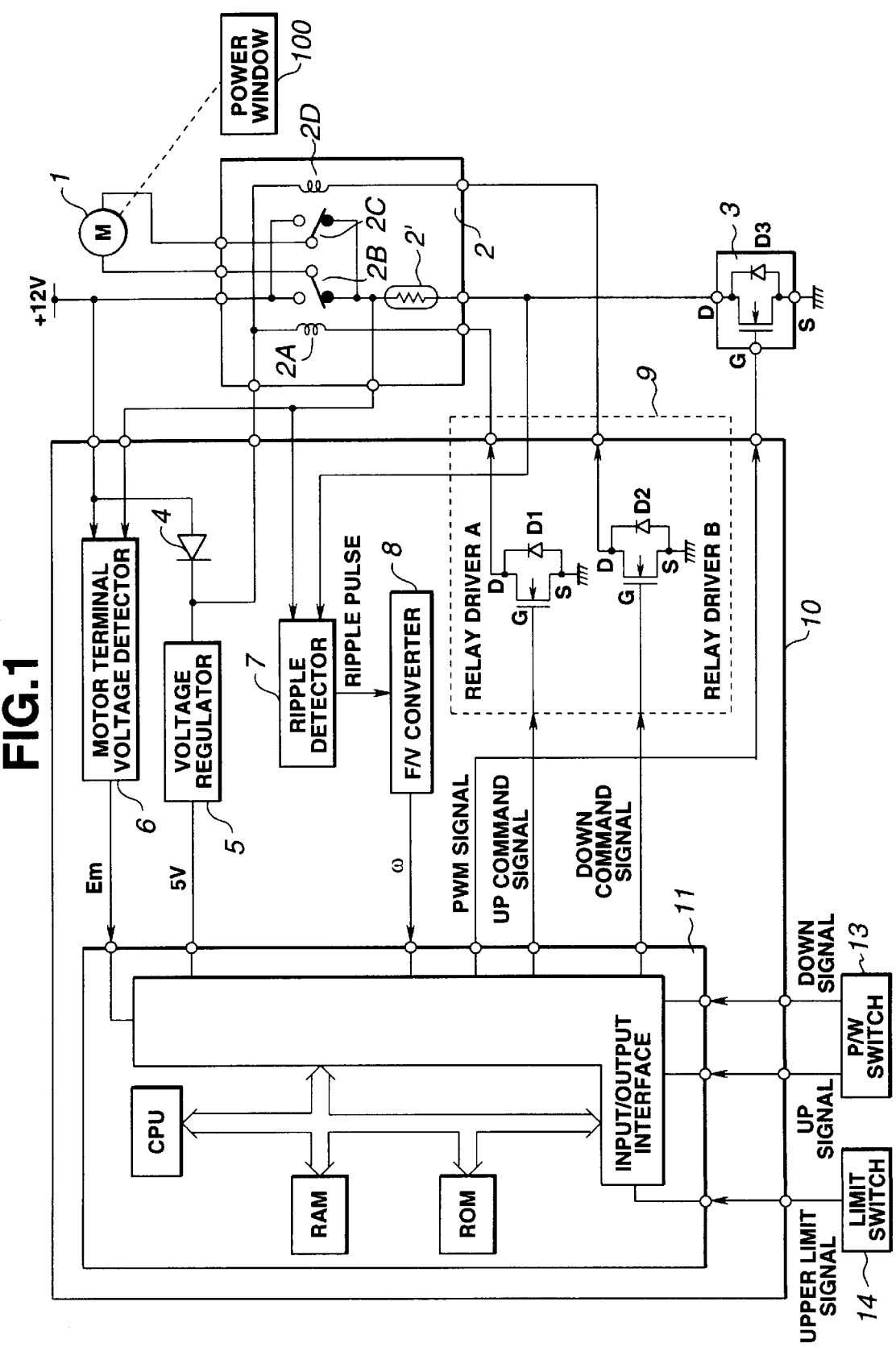
FIG. 1 is a circuit block diagram of an apparatus for determining whether a foreign object or the like is caught in a power open-and-closure mechanism in a first preferred embodiment according to the present invention applicable to a power window motor control circuitry.

FIG. 1 shows a power window motor control circuitry to which a first preferred embodiment of an apparatus for determining whether a foreign object or the like is caught in a open-and-closure mechanism according to the present invention is applicable.

Figure 2:
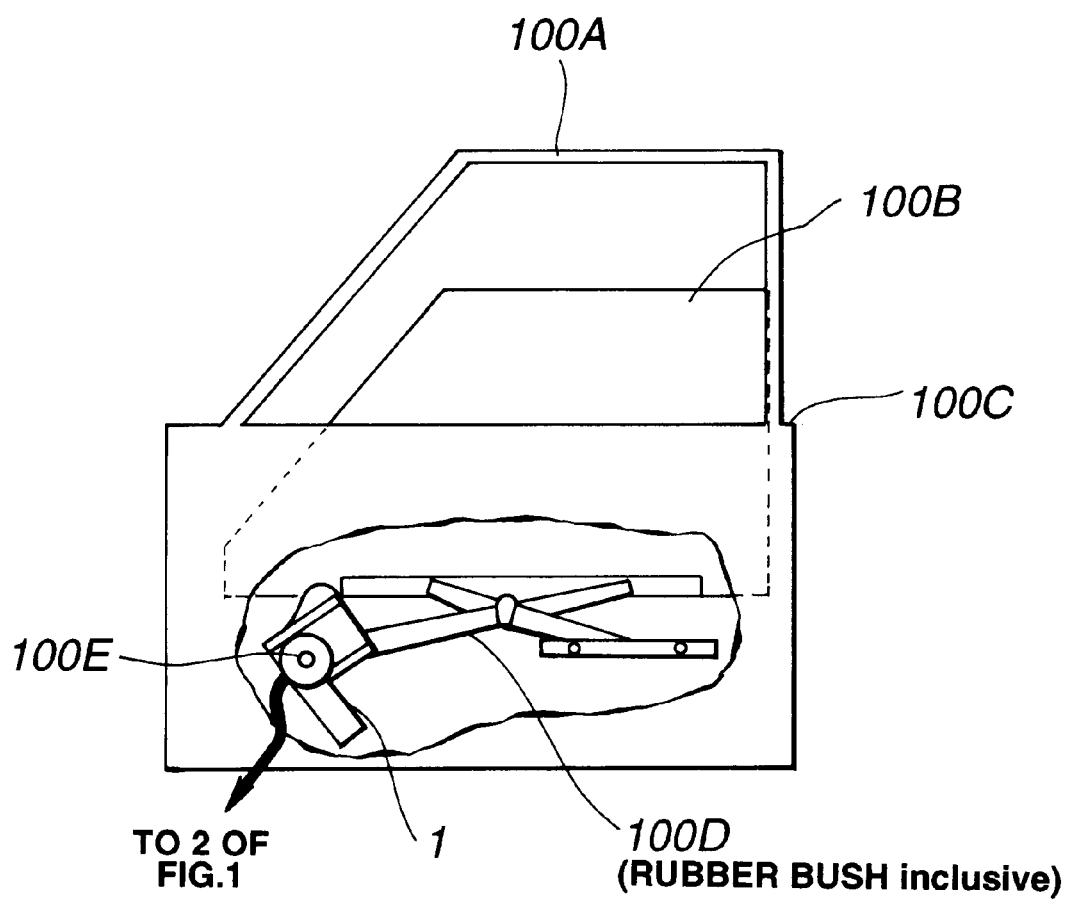
FIG. 2 is an example of an internal structure of a power window installed on an automotive vehicular door to which the apparatus for determining whether the foreign object or the like is caught in the power open-and-closure mechanism in each preferred embodiment is applicable.

FIG. 2 shows an internal structure of a power window 100 shown in FIG. 1.

A power window 100, as shown in FIG. 2, includes a window frame 100A constituting a fixed member of the open-and-closure mechanism (in the first embodiment, the power window), a window glass (window pane) 100B constituting a movable member of the open-and-closure mechanism, a vehicular door panel 100C, cross-coupled type supporting arms 100D, one arm being attached onto a bottom portion of the window pane 100B, a speed reduction gear 100E, and a motor 1. The motor 1 is a reversible DC motor.

Referring back to FIG. 1, the motor 1 (M) serves to drive the power window 100. The motor 1 is connectable to a, for example, 12 volt power supply such as a vehicular battery via a relay 2 of a normally open type. One terminal of the motor 1 is connected to a first movable contact 2B of a relay 2 and the other terminal of the motor 1 is connected to a second movable contact 2C of the relay 2. When a first magnetic relay coil 2A is energized (turned on), the movable contact 2B is contacted on an upper fixed contact, so that +12 V power supply line is connected to the one terminal of the motor 1. At this time, the other terminal of the motor 1 is connected to a drain end of an FET (Field Effect Transistor) driver 3 via the second movable contact 2C and fixed contact. On the other hand, when the first magnetic relay coil 2A is demagnetized (turned off) and the second magnetic relay coil 2D is energized (turned on), the +12 V power line is connected via the second movable contact 2C to the other terminal of the motor 1 and the one terminal of the motor 1 is connected to the drain of the FET driver 3 via the first movable contact 2B and the fixed contact. In this way, a direction of a revolution of the motor 1 can be switched by a change in a polarity of the motor 1 according to a selection of the turning on the first or second magnetic relay coil 2A and 2D so that the motor 1 can be revolved in normal and reverse directions.

Furthermore, the FET driver 3, in response to a FET drive signal (in the embodiment, a PWM signal) from a control circuitry 10, controls a current flowing through the motor 1. The control circuitry 10 includes: a motor terminal voltage detector 6; a ripple detector 7; an F/V converter 8 connected to the ripple detector 7 (F/V converter means a frequency-to-voltage converter); a single-chip microcomputer 11; a relay driver 9; a voltage regulator 5: and a reverse flow blocking diode 4. It is noted that the voltage regulator 5 serves to adjust +12 volts supplied from the DC power supply (vehicular battery) via the blocking diode 4 constantly to +5 volts so as to operate the single-chip microcomputer 11. It is also noted that a power window switch 13 is connected to the single-chip microcomputer 11 of the control circuitry 10 for manually commanding the single-chip microcomputer 11 to move the window pane 100B of the power window in an upward direction so as to be in a closed position (UP signal), to stop the window pane 100B at an intermediate position between a completely closed position and a completely open position, and to move the window pane 100B in a downward direction so as to be in an open position (DOWN signal). In addition, a limit switch 14 is connected to the single-chip microcomputer 11 to inform the single-chip microcomputer 11 that the window pane 100B has reached to its upper limit position (also called, the completely closed position).

The motor terminal voltage detector 6 serves to detect a motor voltage Em which is a terminal voltage (Em) across the motor 1.

The ripple detector picks up a voltage across a resistor 2' installed within the relay 2 and detects and outputs a frequency of a ripple pulse from the current flowing through the resistor 2'. The subsequent F/V converter 9 converts the frequency of the ripple pulse into a corresponding voltage. The resistor 2' is interposed between the motor 1 and the FET driver 3 in series with the relay 2 and the FET driver 3. The ripple pulse frequency is developed in proportion to the motor angular velocity $\omega$. The converted voltage from the F/V converter 8 provides a detected value of the motor angular velocity $\omega$.

It is noted that an input pulse signal to be inputted to the F/V converter 8 may be a pulse signal developed by a pulse encoder which can directly measure the revolution velocity of the motor 1.

It is further noted that the output pulses from the pulse encoder or the ripple pulse generated in the motor 1 may be supplied to the single-chip microcomputer 11 and, then, the single-chip microcomputer 11 may count the number of supplied pulses per time to derive the motor angular velocity $\omega$. In this alternative case, the F/V converter 8 is not needed.

The single-chip microcomputer 11 determines the direction of the revolution of the motor 1 according to a switching state of the power window switch 13 and outputs an up command signal or down command signal as a command signal to a relay driver A or a relay driver B in the relay driver 9, respectively. It is noted that when no up or down command signal is outputted from the single-chip microcomputer 11, the window pane 100B stops.

The relay driver B includes a MOSFET having a flywheel diode D1, a gate (G) of the MOSFET being connected to the single-chip microcomputer 11, a drain (D) of the MOSFET being connected to the first magnetic relay coil 2A, a source (S) thereof being connected to the ground, a cathode of the flywheel diode D1 being connected to the drain (D) thereof, and an anode thereof being connected to the source (S) thereof. The relay driver B of the relay driver 9 includes the same MOSFET having the flywheel diode D2, the connection of the MOSFET and flywheel diode D2, the connection of the MOSFET and flywheel diode D2 being the same as those of the relay driver A provided that its drain (D) is connected to the second magnetic relay coil 2D of the relay 2. When the single-chip microcomputer outputs the UP command signal to the relay driver A, the first magnetic relay coil 2A is energized so that the direction of the current flow to the motor 1 is such that the window pane 100B is raised in the upward direction to the closed position.

On the other hand, the single-chip microcomputer 11 outputs the DOWN command signal to the relay driver B, the relay driver B, in turn, magnetizes the second magnetic relay coil 2D of the relay 2 so that the direction of the current flow to the motor 1 is changed from the case of the first magnetic relay coil 2A such that the window pane 100B is lowered in the downward direction to the open position.

The single-chip microcomputer 11 outputs the PWM (Pulse Width Modulation) signal to the FET driver 3. The PWM signal is a pulsewidth modulated signal having variable on and off duty ratios. When, for example, the power window 100 is started to be closed from a previously open position, the single-chip microcomputer 11 outputs the PWM signal having, at first, an extremely narrow (approximately) pulsewidth and, thereafter, the on duty of a pulse duty ratio being increased at a relatively small rate of change and being finally reached to a relatively large value to the FET driver 3 so that the current flowing through the motor 1 is controlled to achieve a, so-called, soft start and to prevent an occurrence of an inrush current which would occur during the start of driving the motor 1.

The single-chip microcomputer 11 generally includes a CPU (Central Processing Unit), a RAM (Random Access Memory), a ROM (Read Only Memory), an Input/Output interface, and a common bus.

As will be described later, the single-chip microcomputer 11 differentiates the motor angular velocity $\omega$ derived from the F/V converter 8 to derive the motor angular acceleration $d\omega/dt$ ($\omega'$). The single-microcomputer 11 estimates an external disturbance torque T from those detected and derived values described above and calculates a change rate $dT/dt$ (T') of the external disturbance torque T per a minute time t which is a differentiation value of the external disturbance torque T with respect to the minute time t.

The single-chip microcomputer 11, then, compares the change rate $dT/dt$ (T') with a predetermined threshold value so as to determine whether the foreign object or the like is caught in the power window 100 when the window pane 100B is moved in the upward direction to the closed position.

If the single-chip microcomputer 11 determines that the foreign object or the like is caught in the power window 100. In the first embodiment, the single-chip microcomputer 11 issuing the UP command signal, in turn, issues the DOWN command signal to the relay driver B so that the first magnetic relay coil 2A is denergized and the second magnetic relay coil 2D is energized so that the polarity of the motor 1 is reversed and the window pane 100B is once halted and then moved in the downward direction away from the window frame 100A by a predetermined distance to the open position, and, thereafter, the window pane 100B is stopped at a position to which the window pane 100B is moved by the predetermined distance.

The limit switch (or microswitch) 14 outputs an upper limit signal to the single-chip microcomputer 11 when detecting that the window pane 100B has reached to its upper limit position defined as the completely closed position.

At this time, the single-chip microcomputer 11, in response to the upper limit signal, determines that the power windows 100 is in the completely closed position and does not carry out the reverse of the revolution of the motor 1 to move the window pane 100B toward the open position even though determining that the foreign object or the like has been caught in the power window 100.

Consequently, an erroneous drive of the motor 1 by means of the single-chip microcomputer 11 when the window pane 100B is placed at the completely closed position can be prevented.

Next, a basic theory of determination of whether the foreign object or the like is caught in the power window 100 by means of the single-chip microcomputer 11 will be described below.

First, since the external disturbance torque T can be deemed to be the sum of the external disturbance force Ts and the dynamic function resistance Td, the following equation (8) can be established.

$$T = Ts + Td \tag{8}$$

Then, from the equation (5) described in the SUMMARY OF THE INVENTION, Ts+Td=Tm−Tn−Tk. Therefore, the following equation (9) is given:

$$T = Tm - Tn - Tk \tag{9}$$

According to the equation (9) and the above-described equations (1), (2), (3), and (4), the following separate two equations (10) and (11) can be established.

$$T = [Em - (K1 \times \omega)] \times K1/Z - K2 \times \omega - M \times \omega - M \times d\omega/dt$$

$$\therefore T = Em \times K1/Z - [(K1K1/Z) + K2] \times \omega - M \times d\omega/dt \tag{10}$$

$$T = K1 \times Im - K2 \times \omega - M \times d\omega/dt \tag{11}$$

$$\therefore Tm = K1 \times Im, \ Tn = K2 \times \omega, \ Tk = M \times d\omega/dt$$

As appreciated from the equations (10) and (11), the external disturbance torque T is varied in accordance with: (a) the motor terminal voltage Em or the motor current Im; (b) the motor angular velocity ω; and, (c) the motor angular acceleration dω/dt (ω') and can be determined according to these three parameters (a), (b), and (c).

That is to say, the external disturbance torque T can be derived on the basis of at least two of the three parameters of Im, Em, and ω with the equations of (1) and (2) in mind.

The external disturbance torque T is, furthermore, differentiated to derive the change rate dT/dt (T') at which the external disturbance torque T is changed with time t.

The following equation (12) is established from the equation (8) (T=Ts+Td).

$$dT/dt(T') = dTs/dt(Ts') + dTd/dt(Td') \tag{12}$$

In the equation (12), dTs/dt (Ts') denotes the change rate at which the external disturbance force Ts is changed with time and represents the differentiation value of the external disturbance force Ts and dTs/dt (Td') denotes the change rate of the dynamic friction resistance Td per time t and represents a differentiation value of the dynamic friction resistance Td with respect to time t.

It is noted that although the dynamic friction resistance Td included in the external disturbance torque T as in the equation (8) is varied as the time has passed due to the aged deterioration, the change rate dTd/dt (Td') of the dynamic friction resistance Td per time is approximately equal to zero, unless the open-and-closure mechanism, i.e., the power window pane 100B is temporarily stuck on the window frame 100A in a midway through the movement to the completely closed position during the drive of the motor 1 to move the window pane 100B in the upward direction to the closed position, with the foreign object or the like not caught in the power window 100. Consequently, a rate of occupying the change rate dTd/dt (Td') of the dynamic friction resistance Td in the change rate dT/dt (T') of the external disturbance torque T per time is considerably small. Thus, the change rate dTs/dt (Ts') of the external disturbance force Ts per time can be derived from the differentiation value (dT/dt or T') of the external disturbance torque T. In other words, the derivation of the change rate dT/dt (T') of the external disturbance torque T is equivalent to the derivation of the change rate dTs/dt (Ts') of the external disturbance force Ts per time.

Therefore, the single-chip microcomputer 11 can determine whether the foreign object or the like is caught in the power window 100 by comparing the change rate dT/dt (T') of the external disturbance torque T with the predetermined threshold value.

With the above-described theory in mind, the change rate dTd/dt (Td') of the dynamic friction resistance Td per time and the change rate dT/dt (T') of the external disturbance torque T per time can be expressed as follows:

$$dTd/dt(Td') = 0 \tag{13}$$

$$dT/dt(T') = dTs/dt(Ts') \tag{14}$$

Figure 3:
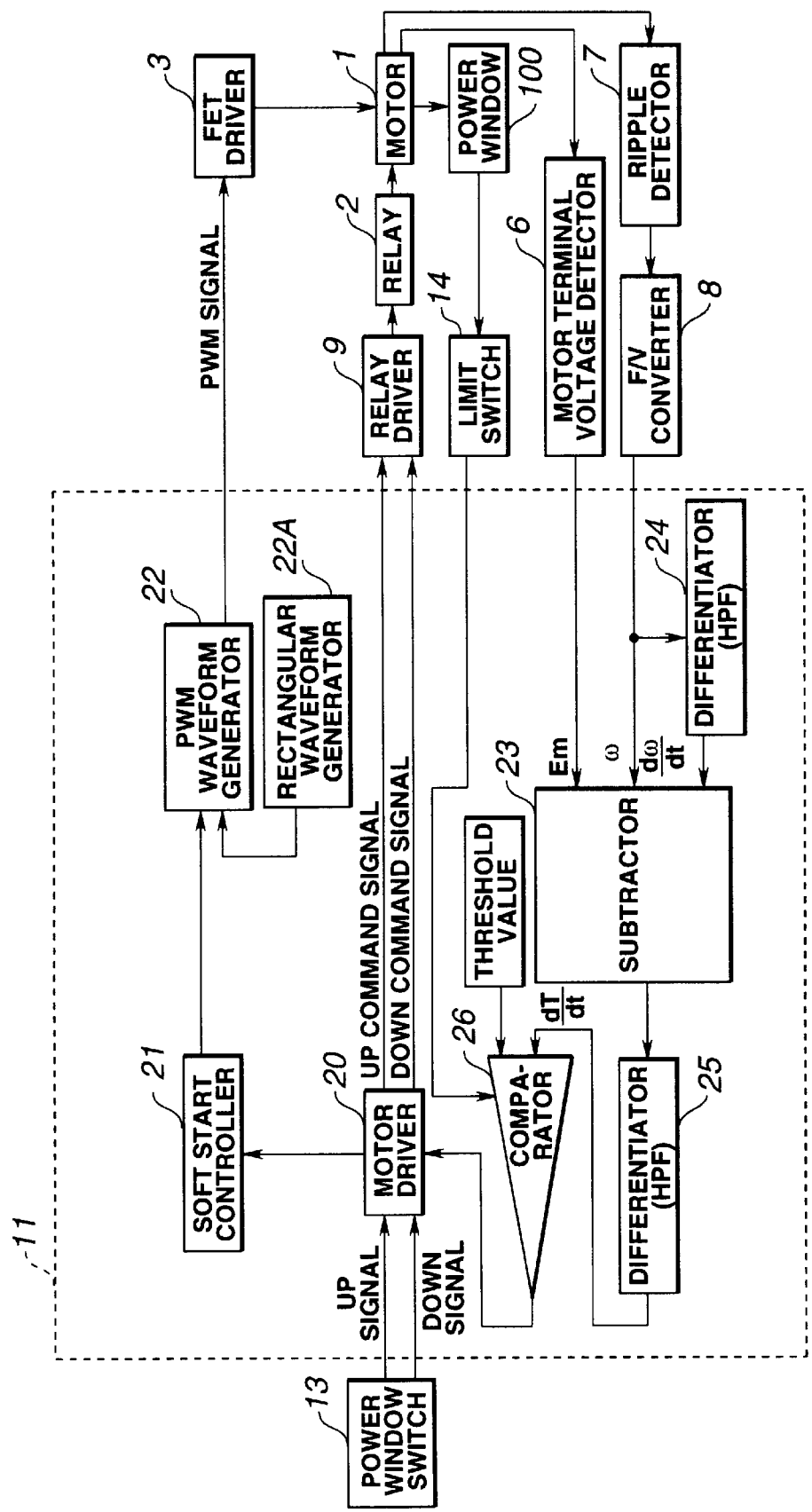
FIG. 3 is a functional block diagram of a single-chip microcomputer and of a peripheral circuit around a motor for driving the power window in the case of the apparatus shown in FIG. 1.

FIG. 3 shows a functional block diagram of the single-chip microcomputer 11 and shows a signal flow of the whole control circuitry 10, a peripheral circuit around the motor 1, and a calculation flow executed in the single-chip microcomputer 11.

A vehicular occupant operates the P/W (power window) switch 13. At this time, the single-chip microcomputer 11 in operation receives the operation information by the occupant through the power switch 13 (UP, DOWN, or STOP). A motor driver 20 in the single-chip microcomputer 11 determines whether the window (glass) pane 100B should be moved in the upward direction to the closed position or should be moved in the downward direction due to the open position according to the operation information (UP signal or DOWN signal) of the P/W switch 13. After the determination of the movement direction of the window pane 100B from the operation information of the power switch 13, the motor driver 20 outputs the command signal of either the UP command signal or DOWN command signal to the relay driver 9 so that the motor 1 is set to the corresponding revolution direction via the relay 2. In addition, the motor driver 20 outputs the result of determination of the movement direction of the window pane 100B to a soft start controller 21.

The soft start controller 21, upon receipt of a determination signal indicating the determination of the movement direction of the window pane 100B from the motor driver 20, outputs a current instruction value for the motor 1 to a PWM waveform generator 22.

The motor current instruction value from the soft start controller 21 is set such that the motor current flowing through the motor 1 is gradually (at a relatively small rate) increased from zero when the determination signal outputted from the motor driver 20 indicates the upward movement of the window pane 100B to the closed position and the window pane 100B of the power window 100 is started to be moved in the upward direction toward the closed position. For example, the motor current instruction value is, at first, approximately zeroed. At this time, the off duty to the on duty of the pulse duty ratio is generally, 100:0, then is increased as 90:10, 80:20, 70:30, 60:40, 50:50, - - -, and finally 0:100. To generate the PWM waveform in a soft start mode, a rectangular waveform generator 22A generating a rectangular waveform having a fixed frequency is connected to the PWM waveform generator 22. The pulse duty ratio of the rectangular waveform is changed according to a pulse duty ratio instruction value which corresponds to the motor current instruction value. However, a triangular waveform generator may be provided in place of the rectangular waveform generator 22A. The current instruction value may slice the triangular waveform sent to the PWM waveform generator 22 to produce an inverted rectangular waveform, this inverted rectangular waveform being shaped to provide an off duty ratio pulse the remaining sliced part of the triangular wave being shaped to an on duty ratio pulse.

Then, the PWM waveform generator 22, in response to the motor current instruction value from the soft start controller 22, outputs the PWM signal whose pulsewidth is gradually increased from approximately zero to the FET driver 3 so as to render the motor 1 to start softly without the inrush current.

The motor driver 20 causes the soft start controller 21 to supply the motor current instruction value to the PWM waveform generator 22 so that the motor 1 whose revolution direction is set by the relay 2 and the relay driver 9 in response to the UP command signal from the motor driver 20 and the window pane 100B is started to be moved in the upward direction to the closed position.

When the limit switch 14 detects that the window pane 100B has reached to the upper limit position (or the completely closed position), the limit switch 14 is turned on to output the upper limit signal to a comparator 26.

When the upper limit signal is received, the comparator 26 halts its comparison operation (reset operation).

On the other hand, the ripple detector 7 detects the ripple frequency from the drive current of the motor 1 through the resistor 2' shown in FIG. 1 (the ripple detector 7 receives the current flowing through the motor 1) and outputs a ripple pulse having to the ripple frequency. This ripple pulse is converted into a corresponding voltage by means of the F/V converter 8 as described above. This converted voltage is proportional to the motor angular frequency ω of the motor 1 and corresponds to the detected value of the motor angular velocity ω.

Hence, the ripple detector 7 and F/V converter 8 function as a detector (detecting means) for detecting the motor angular velocity ω.

The detected value ω is supplied to a subtractor 23 and to a differentiator 24.

The differentiator 24 differentiates the detected value of the motor angular velocity ω to derive the motor angular acceleration dω/dt (ω'). The differentiated value by the differentiator 24 is supplied to the subtractor 23. The motor terminal voltage detector 6 detects the terminal voltage of the motor 1 and outputs the detected value to the subtractor 23.

The subtractor 23 calculates the external disturbance torque T imposed on the motor 1 as the load on the basis of the equation (10) from three parameters of the motor terminal voltage Em of the motor 1, the motor angular velocity ω, and the motor angular acceleration dω/dt (ω').

The calculated external disturbance torque T is differentiated by means of a differentiator 25. Consequently, the change rate dT/dt (T') described above is calculated.

The comparator 26 compares the differentiated value dT/dt (T') of the external disturbance torque T with the predetermined threshold value (a reference value above which the comparator 26 determines that the foreign object or the like is caught in the power window 100).

If the comparator 26 determines that the foreign object or the like is caught in the power window 100 and, during this determination, no upper limit signal is received by the comparator 26, the comparator 26 outputs another determination signal indicating the result of this determination to the motor driver 20.

The motor driver 20, in response to the other determination signal from the comparator 26, during the drive of the motor 1 to move the window pane 100B in the upward direction (refer to FIG. 2) toward the closed position, drives once the motor 1 to revolve in the opposite direction so that the upward moving window pane 100B is reversed to return toward the downward direction by the predetermined distance and thereafter stops the motor 1.

FIGS. 4A, 4B, 4C, and 4D show integrally a voltage waveform chart for explaining the operation of each functional block of the single-chip microcomputer 11 when the motor 1 is started to be driven to move the window pane 100B in the upward direction toward the closed position and until the determination that the foreign object or the like is caught in the power window 100.

Figure 4:
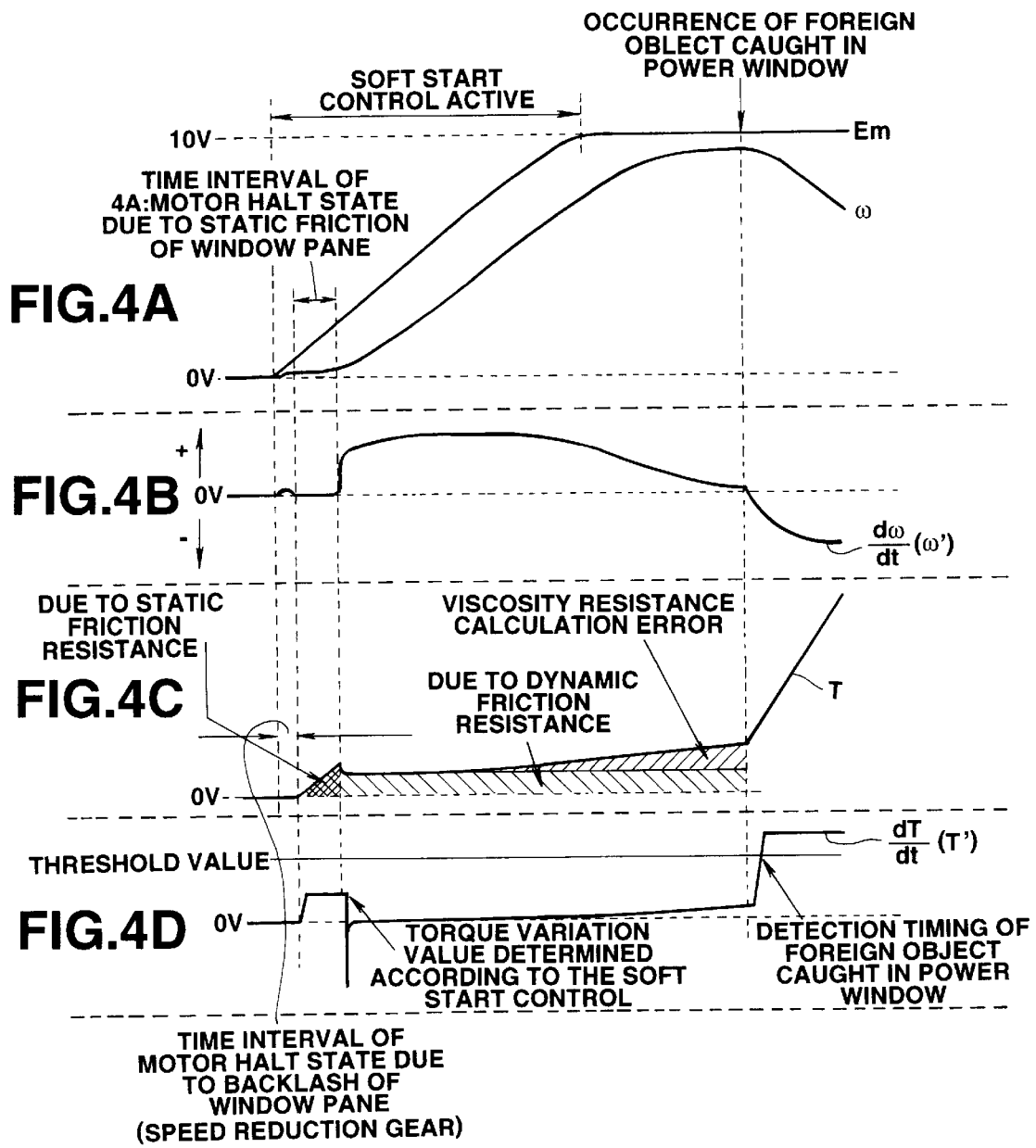
FIGS. 4A, 4B, 4C, and 4D are integrally a voltage waveform chart for explaining the determination of an external disturbance force exerted on the caught foreign object or the like and imposed on the motor shown in FIGS. 1 and 3.

As shown in FIG. 4A, the terminal voltage Em gradually rises since the soft start controller 21 activates the PWM waveform generator 22 to output the PWM signal to the FET driver 3 such that the motor current is increased at the relatively small rate of change. It is noted that since a driving force from the motor 1 is not transmitted to the window pane 100B until a backlash inherently provided in the power window 100 (a mechanical looseness due to a play in the speed reduction gear 100E shown in FIG. 2) is eliminated. Hence, the motor 1 becomes idle and the revolution speed of the motor 1 is increased. However, the window pane 100B is, at this time, not moved. Hence, at this interval of time, the window pane 100B is not moved in the upward direction but the motor angular velocity ω is increased in proportion to the motor voltage Em.

Thereafter, the backlash is eliminated and the driving force of the motor 1 starts to be transmitted to the window pane 100B. However, a static friction resistance force of the window pane 100B is effected and the window pane 100B stands still until the driving force of the motor 1 is in excess of the static friction resistance force.

It is noted that a shock absorber (the shock absorber in this case is constituted by a rubber bush generally positioned on the supporting arms 100D in FIG. 2 and which serves to prevent the window pane 100B and the speed reduction gear 100E from receiving an excessive force to be applied thereto due to a deflection of the rubber bush when a torque is applied to the rubber bush) is interposed between the window 100B and the motor drive system (speed reduction gear 100E mechanically connected to the motor 1). Therefore, the motor 1 can revolve slowly at an approximately constant value. Consequently, the motor angular velocity ω becomes stabilized and is continued with time at a relatively low level. However, the shock absorber (rubber bush) is gradually constricted and the window pane 100B stands still (the window pane 100B is still stopped).

As the driving force of the motor 1 starts to exceed the static friction resistance force, the window pane 100B is, at last, started to be raised in the upward direction.

As shown in FIGS. 4A and 4C, the angular velocity ω of the motor 1 is raised gradually in accordance with the increase in the motor terminal voltage Em up to a steady-state revolution velocity. However, as shown in FIG. 4A, when the foreign object or the like is caught in a midway through the upward movement of the window pane 100B to the upper limit position, the angular velocity ω is abruptly reduced due to a reaction force developed by the caught foreign object against the window pane 100B.

On the other hand, as shown in FIG. 4B, the motor angular acceleration dω/dt (ω') is placed in the vicinity to zero until the window pane 100B is started to be raised in the upward direction to the closed position. At an instantaneous time when the window pane 100B is started to be raised, the motor angular acceleration dω/dt (ω') is raised. Since the motor 1 is accelerated at an approximately steady-state acceleration value due to the soft start mode, the motor angular acceleration becomes stable with respect to time. As the revolution velocity of the motor 1 approaches the steady-state revolution velocity, the acceleration state of the motor 1 becomes dull so that the motor angular acceleration dω/dt (ω') is gradually reduced. During the steady-state revolution state, the motor angular acceleration dω/dt (ω') is gradually reduced to zero. It is noted that if the foreign object or the like is caught in the power window 100, the motor 1 is decelerated so that the angular acceleration dω/dt (ω') takes a negative value and an absolute value |dω/dt| (|ω'|) of the motor angular acceleration dω/dt (ω') is increased with time.

The external disturbance torque T calculated from the motor terminal voltage Em, the motor angular velocity ω, and the motor angular acceleration dω/dt (ω') gives approximately zero since the motor 1 is in the idling condition until the backlash is reduced to zero.

At the next time at which the window pane 100B is in a halt state due to the static friction resistance force, as the increase in the motor terminal voltage Em, the driving force of the motor 1 is increased. At the instantaneous time when the driving force of the motor 1 overcomes the static friction resistance force and the window pane 100B is driven to be moved in the upward direction to the closed position, the static friction resistance force is switched to the dynamic friction resistance force.

Since a maximum value of the static friction resistance force is constantly larger than the dynamic friction force, the external disturbance torque T is instantaneously reduced as shown in FIG. 4C.

During the time interval at which the rise in the motor angular velocity ω occurs and the motor 1 indicates the steady-state revolution velocity state, the external disturbance torque T naturally should give the approximately constant value. However, the external disturbance torque T may often gradually be raised or lowered in proportion to the motor angular velocity ω due to the aged deterioration and/or temperature variation on the viscosity resistance Tn and due to the calculation error in the calculation of the external disturbance torque T.

However, since, in the case of the embodiment, the change rate dT/dt (T') of the calculated external disturbance torque T per time is used to determine whether the foreign object or the like is caught in the power window 100, the error in the calculation due to the aged deterioration and/or due to the temperature variation of these resistance forces Tn and Td is negligible.

When the foreign object or the like is caught in the power window 100, the reaction force developed by the caught foreign object is detected and the external disturbance torque T is accordingly increased.

On the other hand, during the interval of time at which the window pane 100B is halted due to the presence of the static friction resistance force (the force exerted by the static friction resistance), the change rate dT/dt (T') of the external disturbance torque T per time indicates a certain constant value, as shown in FIG. 4D, in accordance with a gradient of the rise of the motor terminal voltage Em caused by the PWM drive method (PWM drive) through the PWM waveform generator 22. This constant value can be suppressed to a low constant value if the increase rate of the pulse duty ratio of the PWM signal in the soft start mode is adjusted. In addition, a variation in the change rate dT/dt (T') of the external disturbance T with time is minute and negligible, as shown in FIG. 4D, until the occurrence of the foreign object or the like caught in the power window 100. However, at the instant time when the comparator 26 of the single-chip microcomputer 11 determines that the foreign object or the like is caught in the power window 100, the change rate dT/dt (T') to be compared with the predetermined threshold value is abruptly raised as shown in FIG. 4D. By comparing the abruptly raised change rate dT/dt (T') of the external disturbance torque T with the predetermined threshold value, the comparator 26 can determine whether the foreign object or the like is caught in the power window 100.

At this time, an increased rate of the disturbance torque T becomes larger as the foreign object is a more rigid body and becomes smaller as the foreign object is a more flexible body. Hence, a maximum value of the change rate dT/dt of the external disturbance torque T per time which has abruptly been raised becomes larger as the foreign object is the more rigid body and becomes smaller as the foreign object is the more flexible body.

In the above-described method of the determination of the presence or absence of the foreign object or the like caught in the power window 100, there may exist such an doubt that the comparator 26 cannot determine the presence of the caught foreign object or the like which is considerably flexible (soft) body. However, as a practical matter of fact, even if the foreign object caught in the power window 100 is remarkably flexible (soft), there is no such a foreign object as having a still continued small reaction force against the external disturbance force to squeeze the caught foreign object and the reaction force of the remarkably flexible foreign object against the driving force exerted by the motor 1 to move the window pane 100B toward the closed position is, at last, developed largely anywhere before the window pane 100B has reached to the upper limit position.

In the first embodiment, the change rate dT/dt (T') of the external disturbance torque T is an object to be determined as the presence or absence of the caught foreign object. Although the dynamic friction resistance Td included in the external disturbance torque T is varied with time (due to the aged deterioration), the dynamic friction resistance Td is not reflected on the change rate dT/dt (T') of the external disturbance torque T. Consequently, an accurate determination of the foreign object caught in the power window 100 can be achieved and a stable determination thereof can be made before the driving force to squeeze the foreign object caught in the power window 100 becomes large so as to prevent the motor 1 from being overloaded, regardless of a rigidity of the caught foreign object.

(Second Embodiment)

Figure 5:
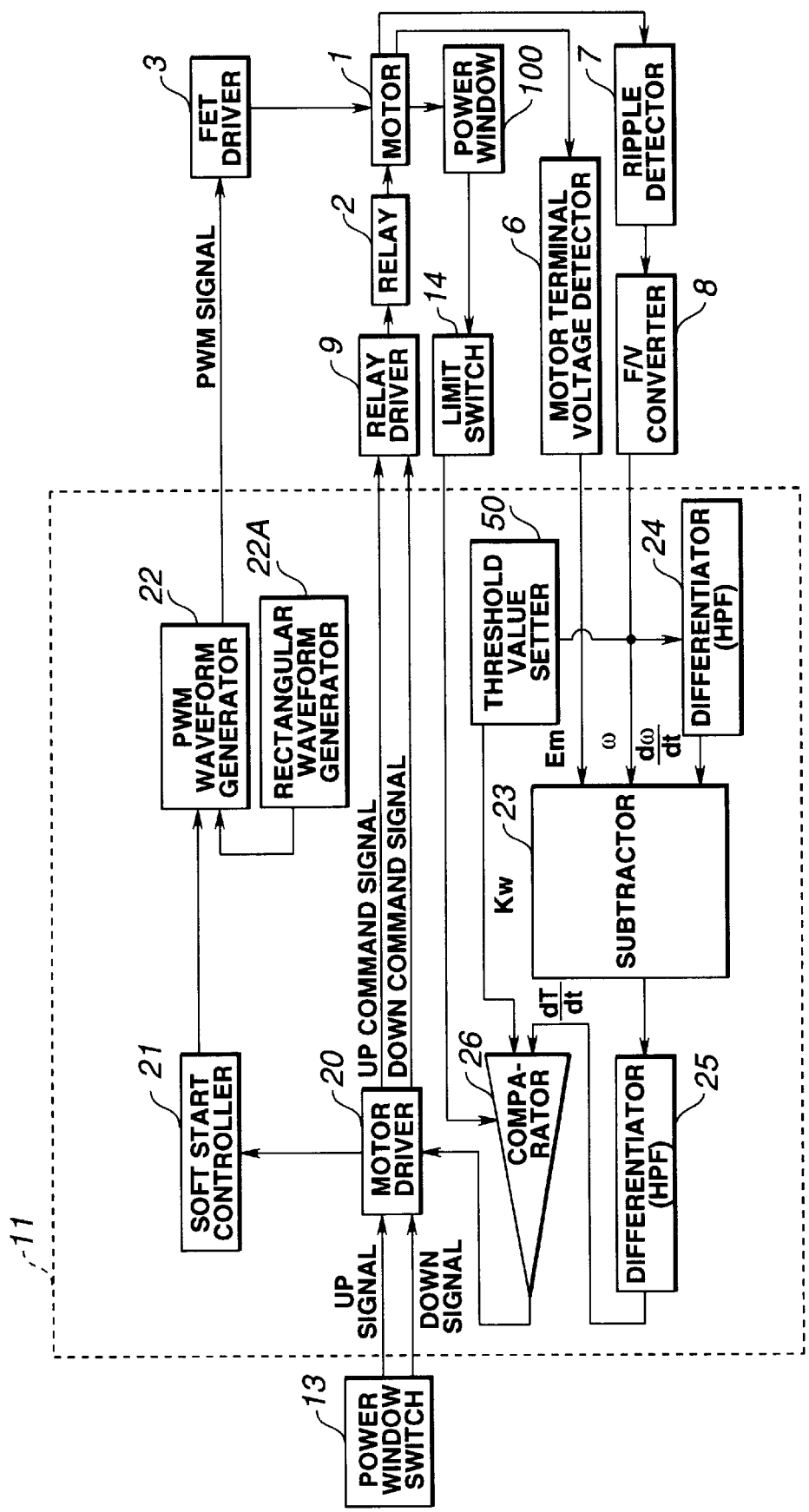
FIG. 5 is a functional block diagram of the single-chip microcomputer in the apparatus for determining whether the foreign object or the like is caught in the power open-and-closure mechanism in a second preferred embodiment according to the present invention applicable to the power window motor control circuitry.

FIG. 5 shows a functional block diagram of the power window control circuitry to which a second preferred embodiment of the apparatus for determining whether the foreign object or the like is caught in the power open-and-closure mechanism such as the power window 100 is applicable.

A large difference from the first embodiment is that in the functional block diagram of the single-chip microcomputer 11 shown in FIG. 3, a threshold value setter 50 is interposed between the comparator 26A and the differentiator 24. The predetermined threshold value setter 50 (also called, a reference value preparing block) prepares the predetermined threshold value Kw for the determination of the foreign object or the like caught in the power window 100 on the basis of the detected value of the motor angular velocity ω outputted from the F/V converter 8. The comparator 26A compares the change rate dT/dt (T') described in the first embodiment with the predetermined threshold value Kw so as to determine whether the foreign object or the like is caught in the power window 100 with a spring constant that the foreign object has taken into consideration.

The other function and structure in the second embodiment are generally the same as described in the first embodiment with reference to FIG. 3.

The basic theory of determination of the presence or absence in the foreign object or the like caught in the power window 100 in the case of the second embodiment will be described in details below.

Suppose a relationship between a change $\Delta F$ with a minute time interval $\Delta t$ of the reaction force generated by the foreign object or the like when the foreign object or the like is caught in the power window 100 and a change (displacement) $\Delta X$ of a position at which the window pane 100B and the opposing window frame 100A of the power window 100 continues to squeeze the caught foreign object or the like toward the completely closed position.

In this case, the caught foreign object or the like always increases its reaction force according to a distance by which the window pane 100B and the window frame 100A continue to squeeze the caught foreign object or the like. Hence, supposing that the spring constant of the foreign object or the like is denoted by K3, the following equation (15) is established:

$$\Delta F = K3 \times \Delta X \quad (15)$$

At this time, the spring constant K3 takes a positive value which is not a constant value and the spring constant K3 is determined according to the distance by which the caught foreign object or the like is continued to be squeezed.

In addition, since the change rate dTs/dt (Ts') of the external disturbance force Ts is equal to the change $\Delta F$ of the reaction force generated by the foreign object or the like per the minute time interval $\Delta t$, the following equation (16) is established.

$$dTs/dt(Ts') = \Delta F/\Delta t \quad (16).$$

Furthermore, since the motor angular velocity $\omega$ is equal to the change $\Delta X$ of the above-described position per the minute time interval $\Delta t$, the following equation (17) is established.

$$\omega = \Delta X/\Delta t \quad (17).$$

Hence, the following equation (18) is given from the equations (15), (16), and (17).

$$dTs/dt(Ts') = K3 \times \omega \quad (18).$$

In addition, the following equation (19) is introduced from the equations (14) and (18).

$$dT/dt(T') = K3 \times \omega \quad (19).$$

The comparator 26A compares the change rate dT/dt (T') of the calculated external disturbance torque T with the threshold value determined by a product between a predetermined value on the spring constant K3 and the motor angular velocity $\omega$, namely, determined in proportion to the motor angular velocity $\omega$ and can determine that the foreign object or the like is caught in the power window 100 when the spring constant of the caught foreign object or the like is in excess of the predetermined value on the spring constant K3.

As shown in FIG. 5, the threshold value Kw which is increased in proportion to the motor angular velocity $\omega$. It is noted that when the motor angular velocity $\omega$ is equal to or below a certain constant value denoted by a in FIG. 6, the value of Kw indicates a relatively large value. This is because, as described with reference to FIGS. 4A through 4D, during the time interval at which the window pane 100B is halted though the motor 1 is revolved, an erroneous determination of the catching of the foreign object is prevented.

In addition, the threshold value Kw may be prepared by a polygonal line generator. Or alternatively, the characteristic graph of the threshold value Kw shown in FIG. 6 may be stored in the ROM of the single-chip microcomputer 11 and the value of Kw may be read out according to the motor angular velocity $\omega$ using a table look-up method.

FIGS. 7A and 7B integrally show the waveform chart of the motor terminal voltage Em, the motor angular velocity $\omega$, the change rate T' (dT/dt) of the external disturbance torque T, and a locus of the threshold value Kw prepared according to the motor angular velocity $\omega$ in accordance with the characteristic graph shown in FIG. 6.

During the time consecutive intervals at which the window pane 100B is halted through the motor 1 is revolved due to the backlash of the speed reduction gear 100E and due to the static friction resistance force, the motor angular velocity $\omega$ indicates an extremely low value as shown in FIG. 7A. During these consecutive intervals, the calculation error becomes large and the change rate dT/dt (T') of the external disturbance torque T indicates the certain constant value exceeding zero, as shown in FIG. 7B.

As shown in FIG. 6, when the motor angular velocity $\omega$ is equal to or below the certain constant value a, the change rate dT/dt (T') thereof indicates the relatively large value. However, as shown in FIG. 7B, the change rate dT/dt (T') is not in excess of the predetermined threshold value Kw. Next, when the window pane 100B is started to be driven to move in the upward direction to the closed position, the predetermined threshold value Kw is gradually increased in accordance with the equation (19) as the motor angular velocity $\omega$ is increased and the correction of the predetermined threshold value Kw for the motor angular velocity $\omega$ is carried out.

Consequently, the spring constant of the caught foreign object or the like is directly determined. A more accurate determination of the presence or absence of the foreign object or the like caught in the power window 100 can be achieved.

Furthermore, the external disturbance force Ts imposed on the caught foreign object or the like to squeeze the foreign object or the like can be reduced.

In addition, as a practical matter of fact, it is considered that various errors with respect to theoretical values such as the increase of the external disturbance force imposed on the caught foreign object or the like due to a delay of a signal processing in the control circuitry 10 and a difference in the external disturbance force caused by the deflection in the power window 100 (power open-and-closure mechanism), these errors being varied in accordance with the motor angular velocity co, except the calculation error generated due to the backlash and the static friction resistance force. With the various errors with respect to the theoretical values in mind, the threshold value Kw is prepared according to the value of the motor angular velocity $\omega$ so as to correct the theoretical values. Hence, a more stable determination of the presence or absence of the foreign object or the like caught in the power window 100 can be achieved.

(Third Embodiment)

Figure 8:
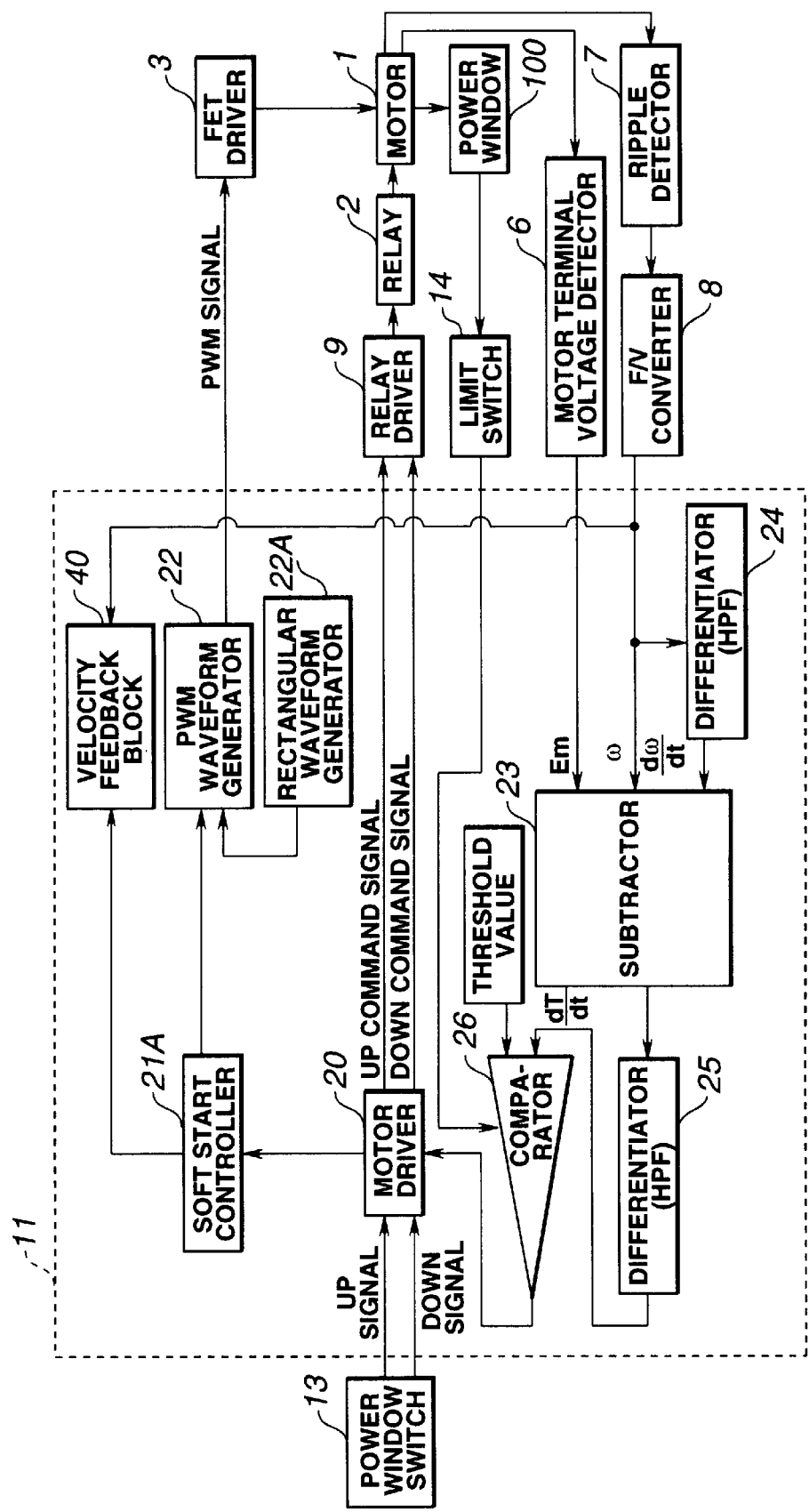
FIG. 8 is a functional block diagram of the apparatus for determining whether the foreign object is caught in the power open-and-closure mechanism in a third preferred embodiment according to the present invention applicable to the power window motor control circuitry.

FIG. 8 shows a functional block diagram of the power window control circuitry to which a third preferred embodiment of the apparatus for determining whether the foreign object or the like is caught in the power open-and closure mechanism such as the power window 100 according to the present invention is applicable.

In the third embodiment, a velocity feedback block 40 is added in the functional block circuit of the power window motor control circuitry in the first embodiment shown in FIG. 3.

That is to say, the velocity feedback block 40 outputs the motor current instruction value to the PWM waveform generator 22B, the motor current instruction value being such that the motor angular velocity ω does not exceed its predetermined maximum value, on the basis of the detected value of the motor angular velocity ω outputted by the F/V converter 8 and a target value of the motor current outputted by the soft start controller 21A. The other function and structure in the third embodiment are generally the same as described in the first embodiment.

The soft start controller 21A executes the soft start operation such that the target value of the current flowing through the motor 1 is gradually increased. The velocity feedback block 40 monitors the motor angular velocity ω outputted by the F/V converter 8 and the target value of the motor current outputted by the soft start controller 21A and executes such a feedback control that in a case where the motor angular velocity ω exceeds the predetermined maximum value, the motor current instruction value to be supplied to the PWM waveform generator 22B is reduced with respect to the target value of the motor current inputted from the soft start controller 21A so that the motor angular velocity ω does not exceed the predetermined maximum value.

Since the above-described velocity feedback block 40 is added, the maximum value of the motor angular velocity ω is not varied even though the variations in the dynamic friction resistance force Td and the viscosity resistance force Tn and/or the variation in the power supply voltage occur.

Consequently, the various errors with respect to the theoretical values which are varied in accordance with the motor angular velocity ω as described in the second embodiment can be converged into constant values since the maximum value of the motor angular velocity ω is restricted. Hence, a more stable determination of the presence or absence of the foreign object or the like caught in the power window 100B can be achieved.

(Fourth Embodiment)

Figure 9:
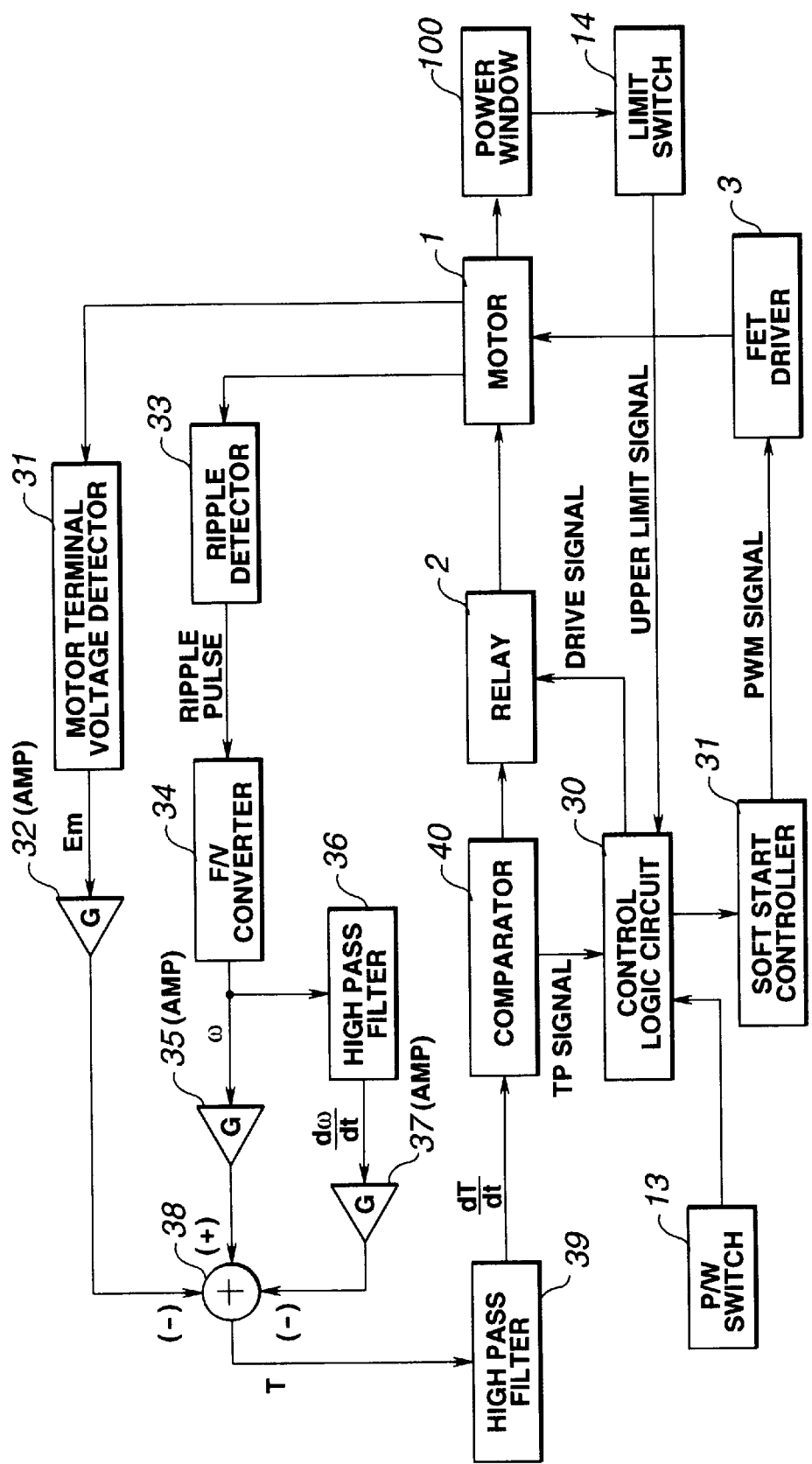
FIG. 9 is a circuit block diagram of the apparatus for determining whether the foreign object or the like is caught in the power open-and-closure mechanism in a fourth preferred embodiment according to the present invention applicable to the power window motor control circuitry.

FIG. 9 shows a circuit block diagram of the power window motor circuitry to which a fourth preferred embodiment of the apparatus for determining whether the foreign object or the like is caught in the power open-and-closure mechanism such as the power window 100 is applicable.

In the fourth embodiment, an analog calculation circuit is used in place of the single-chip microcomputer 11 as described in the first embodiment shown in FIGS. 1 and 3.

It is noted that the controls of the revolution and direction of the revolution of the motor 1 are carried out in a control logic circuit 30, in this embodiment.

A motor terminal voltage detector 31 detects the terminal voltage Em across the motor 1. An amplifier 32 has a gain G, amplifies the terminal voltage Em, and outputs the amplified terminal voltage to a minus (−) input terminal of a differential amplifier 38. A ripple detector 33 detects the ripple frequency from the current flowing through the motor 1 and outputs the ripple pulse having the ripple pulse frequency. The F/V converter 34 converts the ripple pulse into the corresponding voltage so as to detect the motor angular velocity ω. An amplifier 35 amplifies the motor angular velocity ω with its gain G and outputs the amplified motor angular velocity ω to a plus (+) input terminal of the differential amplifier 38. A high pass filter 36 differentiates the motor angular acceleration dω/dt (ω'). An amplifier 37 amplifies the motor angular acceleration dω/dt (ω') with its gain G and outputs the amplified motor angular acceleration to another minus input terminal of the differential amplifier 38.

The constants described in the equation (10) are simplified as follows:

G1=K1/Z, G2=K1K1/Z, and G3=M.

According to this simplification, the equation (10) can be introduced as:

T=G1×Em−G2×ω−G3×dω/dt(ω')     (20).

Consequently, the gains G of the respective amplifiers 32, 35, and 37 are adjusted to provide G1, G2, and G3, respectively.

Hence, as appreciated from the equation (20), the differential amplifier 38 can derive the external disturbance torque T imposed on the motor 1.

In addition, a high pass filter 39 differentiates the external disturbance torque T which is the output of the differential amplifier 38 to derive the change rate dT/dt (T') of the external disturbance torque T.

A comaprator 40 compares the change rate (dT/dt) (T') of the external disturbance torque T with the threshold value described in the first embodiment and outputs the determination signal (TP) indicating that the change rate dT/dt (T') is in excess of the threshold value to the control logic circuit 30, determining that the foreign object or the like is caught in the power window 100.

The control logic circuit 30 determines whether the window pane 100B should be open or should be closed according to the operation state in the power window (P/W) switch 13, outputs the corresponding drive signal (UP command signal or DOWN command signal) to the relay 2, and sets the motor 1 to revolve in the corresponding direction. In addition, the control logic circuit 30 outputs the soft start signal to the soft start controller 31. At this time, the soft start controller 31, in response to the soft start signal, outputs the PWM signal to the FET driver 3, the PWM signal having the pulsewidth which becomes wider as the time has passed. This PWM signal has been explained in the first embodiment. Thus, the motor 1 is in the soft start mode when the window pane 100B is driven to be moved in the upward direction to the closed position. The drive of the motor 1 causes the power window 100 to be operated. The limit switch 14 detects the power window 100 being in the completely closed position (the upper limit position) and outputs the detection signal (upper limit signal) to the control logic circuit 30.

The control logic circuit 30, in response to the upper limit signal from the limit switch 14, does not output the DOWN command signal even if the comparator 40 outputs the determination signal indicating that the foreign object or the like is caught in the power window 100 to the control logic circuit 30.

In the fourth embodiment, the series of calculations carried out in the single-chip microcomputer 11 and described in the first embodiment are executed by means of the analog circuits shown in FIG. 9. Calculation speeds are improved and a manufacturing cost of the whole motor control circuitry becomes reduced.

The same advantages as the first embodiment except the above described advantage are applied equally well to the fourth embodiment.

(Fifth Embodiment)

Figure 10:
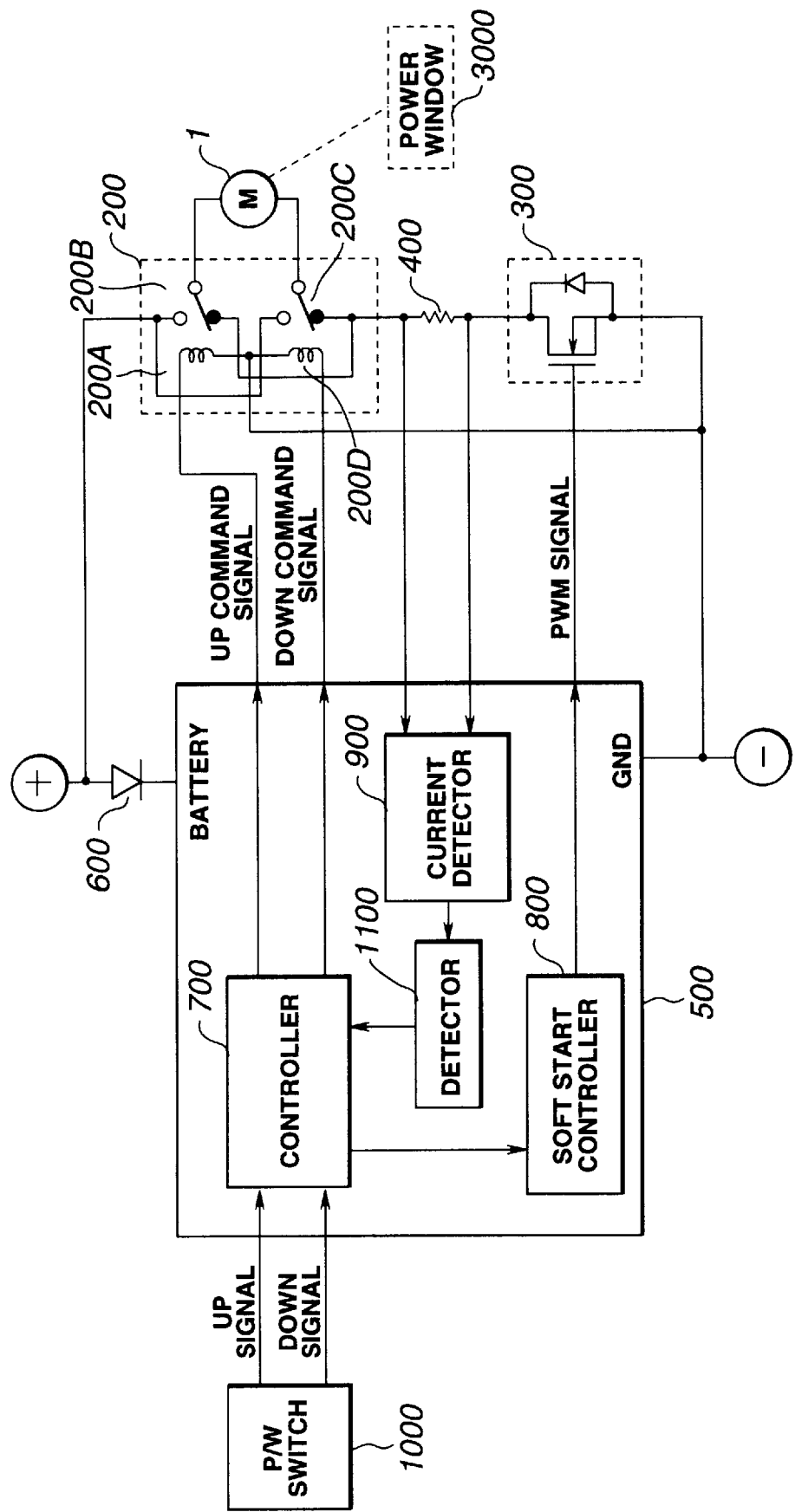
FIG. 10 is a circuit block diagram of the apparatus for determining whether the foreign object or the like is caught in the power open-and-closure mechanism in a fifth preferred embodiment according to the present invention applicable to the power window motor control circuitry.

FIG. 10 shows a circuit block diagram of the power window control circuitry to which a fifth preferred embodiment of the apparatus for determining whether the foreign object or the like is caught in the power open-and-closure mechanism such as the power window 3000 is applicable.

In FIG. 10, + mark denotes the plus terminal of the vehicular battery (DC power supply), − mark denotes the minus terminal (ground) of the vehicular battery. The plus power supply line is connected to one fixed contacts of a first relay contact 200B and a second relay contact of the relay 200 and to the anode of the reverse flow blocking diode 600. The cathode of the diode 600 is connected to the control circuitry 500. One terminal of the motor 1 is connected to the movable contact of the first relay contact 200B. The other terminal of the motor 1 is connected to the other movable contact of the second relay contact 200C. When a first magnetic relay coil 200A is not energized, the movable contact of the first relay contact 200B is contacted on the first contact thereof. When a second magnetic relay contact 200D is not energized, the movable contact of the second relay contact 200C is connected to the other fixed contact of the second relay contact 200C. Both of the other fixed contacts of the first and second relay contacts 200B and 200C are connected to the minus terminal of the vehicular battery, i.e., the ground. The motor 1 is mechanically connected to the power window 3000. The power window 3000 corresponds to that denoted by 100 shown in FIG. 1. A resistor 400 is connected to the relay 200 and to the FET driver 300. The resistor 400 may correspond to that denoted by 2' in FIG. 1. The structure of the FET driver 300 is the same as that denoted by 3 in FIG. 1.

If a vehicle user should mistake the connection of the plus terminal and minus terminal of the battery, the current does not flow into the control circuitry 500 due to the presence of the diode 600 and the motor 1 is not activated. The motor 1 is disconnected from the relay 200 unless the control circuitry 500 outputs the drive signal (Up command signal or DOWN command signal) to the relay 200. When the first magnetic relay coil 200A is energized upon receipt of the UP command signal, the movable contact of the first relay coil 200B so that the motor 1 is connected to the plus terminal of the battery and to the FET driver 300 and is revolved to start to move the power window 3000 in the upward direction toward the closed position. A controller 700 in the control circuitry 500 outputs a soft start (command) signal to the soft start controller 800 upon the receipt of the UP signal from the power window switch 1000. The power window switch 1000 corresponds to that denoted by 13 in FIG. 1. The controller 700, in response to the DOWN signal from the power switch 1000, outputs the DOWN command signal to the second magnetic relay coil 200D. At this time, the movable contact of the second relay contact 200C is, in turn, contacted on the one fixed contact thereof so that the other terminal of the motor 1 is connected to the plus terminal of the battery and to the FET driver 3000 and the motor 1 is revolved in the opposite direction to move the power window 3000 toward the open position.

A current detector 900 detects the current flowing through the motor 1 via the resistor 400. The soft start controller 800 outputs the PWM signal having the pulse duty ratio of approximately 100% to the FET driver in the case where the power window 3000, i.e., the window pane 100B is driven to be moved in the downward direction toward the open position and having the pulse duty ratio of, first, approximately zero and thereafter the pulse duty ratio increased gradually at the relatively small rate of change in the case where the power window 3000 is moved in the upward direction toward the closed position to achieve the soft start.

A detector 1100 receives the detected value of the current flowing through the motor 1 from the current detector 900, derives a change rate of the motor drive current flowing through the motor 1 per the minute time, and compares the change rate of the motor current with a predetermined threshold value so as to determine whether the foreign object or the like is caught in the power window 3000. If the foreign object is caught in the power window 3000, the detector 1100 outputs the determination signal indicating that the foreign object or the like is caught in the power window 3000 to the controller 700.

Upon receipt of this determination signal, the controller 700 outputs the DOWN command signal to the second magnetic relay coil 200D of the relay 200 to reverse the revolution direction of the motor 1 so as to move the window pane 100B in the downward direction toward the open position for a constant period of time via the motor 1. Thereafter, the motor 1 is again driven to move the window pane B of the power window 3000 toward the closed position.

Next, an operation of the fourth embodiment shown in FIG. 10 will be described with reference to FIGS. 11A through 11G.

FIGS. 11A through 11G show signal waveform charts for explaining the operation of each functional block shown in FIG. 10.

Figure 11:
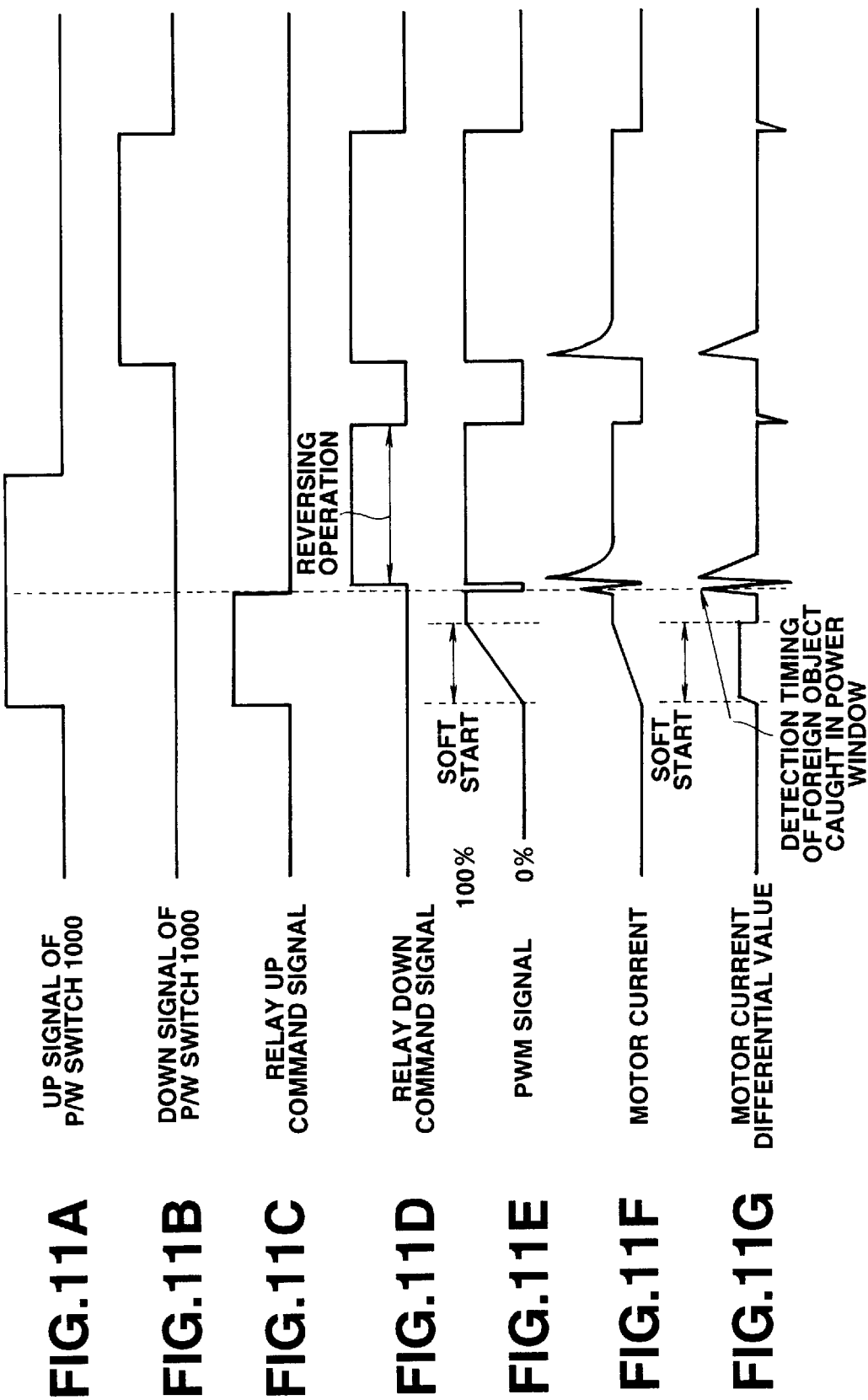
FIGS. 11A, 11B, 11C, 11D, 11E, 11F, and 11G are integrally a voltage waveform chart of each signal in the case of the fifth embodiment shown in FIG. 10 when the power window is driven by a motor to be moved in the upward and downward directions to the closed and open positions.

When the power window switch 1000 is operated to output the UP signal to the controller 700 for the window 100B to be raised toward the closed position, the controller 700 outputs the UP command signal to the relay 200 (refer to FIGS. 11A and 11C). At almost simultaneously, the soft start controller 800 outputs the PWM signal to the FET driver 300 so that the current flowing through the motor 1 is gradually increased. The PWM signal, in this case, has the pulse duty ratio is started from approximately 0%, gradually increased, and finally reached to approximately 100%. The soft start drive mode, as shown in FIG. 1E, causes the motor 1 to gradually accelerate. The current detector 900 detects such a current flowing through the motor 1 as to be smoothly changed in proportion to the motor angular velocity, as shown in FIG. 11F.

At this interval, a differentiated value of the current flowing through the motor 1 is settled at a certain constant value. The inrush current generated when the motor 1 is activated is caused by a coil in the motor 1 by which a current is generated in proportion to the differentiated value of the current flowing through the motor 1 and an inductance L of the coil itself (Ldi/dt).

The differentiated value of the current flowing through the motor 1 being settled at the certain constant value means that the increase rate of the current flowing through the motor 1 is so suppressed due to the soft start mode as not to affect the accuracy of determination of the presence or absence in the foreign object or the like caught in the power window 3000.

Hence, the soft start mode causes the increase rate of the current flowing through the motor 1 to be settled at the certain constant value (refer to FIG. 11G) unless the catch of the foreign object or the like in the power window 3000 occurs. Therefore, even if the detector 1100 determines that the foreign object or the like is caught in the power window 3000 immediately after the activation of the motor 1, its result of determination is not erroneous.

In addition, it is not necessary in the power window open mode to provide an interval of time during which the result of determination is neglected.

When the foreign object or the like is caught in the power window 3000, such an external force as to obstruct the movement of the window pane 100B is acted upon the window pane 100B. At this time, the driving force exerted by the motor 1 is increased and an abrupt increase in the motor current is exhibited so that the differentiated value of the current flowing through the motor 1 indicates a large value as shown in FIGS. 11F and 11G. Hence, if the differentiated value of the current flowing through the motor 1 is compared with the corresponding threshold value, the occurrence of the catch of the foreign object or the like in the power window 3000 can be determined.

The detector 1100 outputs the determination signal indicating that the foreign object or the like is caught in the power window 3000 to the controller 700. The controller 700, then, outputs the DOWN command signal to the relay 200 so that the direction of the revolution of the motor 1 is reversed to move the window pane 100B in the downward direction to the open position within a constant period of time as shown in FIG. 11D, in spite of the fact that the power window switch 1000 is operated to output the UP signal to the controller 700.

At this time, the reverse operation of the motor 1 causes an abrupt rise in the current flowing through the motor 1 so that the differentiated value of the current indicates the large value. However, since the pane 100B is in the downward direction to the open position. Hence, the detector 1100 does not determine the presence in the foreign object or the like caught in the power window 3000 and does not output the determination signal to the controller 700.

Consequently, the erroneous determination of the presence of the foreign object or the like can be avoided.

When the controller 700, upon the completion of the reverse operation, again controls the revolution and the direction of the revolution of the motor 1 on the basis of the operated state of the power window switch 1000.

In FIG. 11A, since the operated state of the power window switch 1000 to output the UP signal to move the window glass pane 100B in the upward direction to the closed position is ended, the motor 1 is disconnected from the relay 200.

When the power window switch 1000 is operated to output the DOWN signal, as shown in FIG. 11B, to the controller 700. The controller 700, then, outputs the DOWN signal to the relay 200. The soft start controller 800, then, outputs the PWM signal to the FET driver 300. At this time, the pulse duty ratio of the PWM signal is approximately 100%. Consequently, the window pane 100B is moved in the downward direction to the open position at a speed faster than the upward direction to the closed position. In this open movement case, the current flowing through the motor 1 and its differentiation value are neglected. The detector 1100 does not execute the determination of whether the foreign object or the like is caught in the power window 3000.

In the fifth embodiment, the FET driver 3000 is used in the motor drive circuit. The soft start mode is used when the window pane 100B is moved in the upward direction to the closed position. Hence, no inrush current flows. In addition, it is not necessary to provide the interval of time at which the result of determination of whether the foreign object or the like is caught in the power window 3000 is neglected in order to avoid the erroneous determination of the catch of the foreign object or the like in the power window due to the abrupt change in the current. It is possible for the determination of whether the foreign object or the like is caught in the power window 3000 to be started when the window pane 100B is started to be driven to be moved in the upward direction to the closed position. The reverse of the motor revolution direction is carried out by the change in the relay contacts of the relay 200 so that the single FET driver 3000 can advance the soft start.

Furthermore, the relay 200 is normally in the state where the motor 1 is disconnected from the plus power supply terminal. If the user should mistake the plus terminal of the battery to be connected to the minus terminal as shown in FIG. 10 and vice versa, the reverse flow blocking diode 600 causes the control circuitry 500 to be not operated. A parasitic diode of the FET driver 3000 receives no current so that the FET driver 3000 ca be protected. Since, for the reverse blocking diode, a current consumed by the control circuitry 500 is minute and is approximately several hundred milli-amperes (mA) with a drive (energizing) current to the relay 200 (first or second magnetic relay coil 200A or 200D) taken into consideration, a heat generation quantity and parts cost are negligibly small.

(Alternative)

Figure 12:
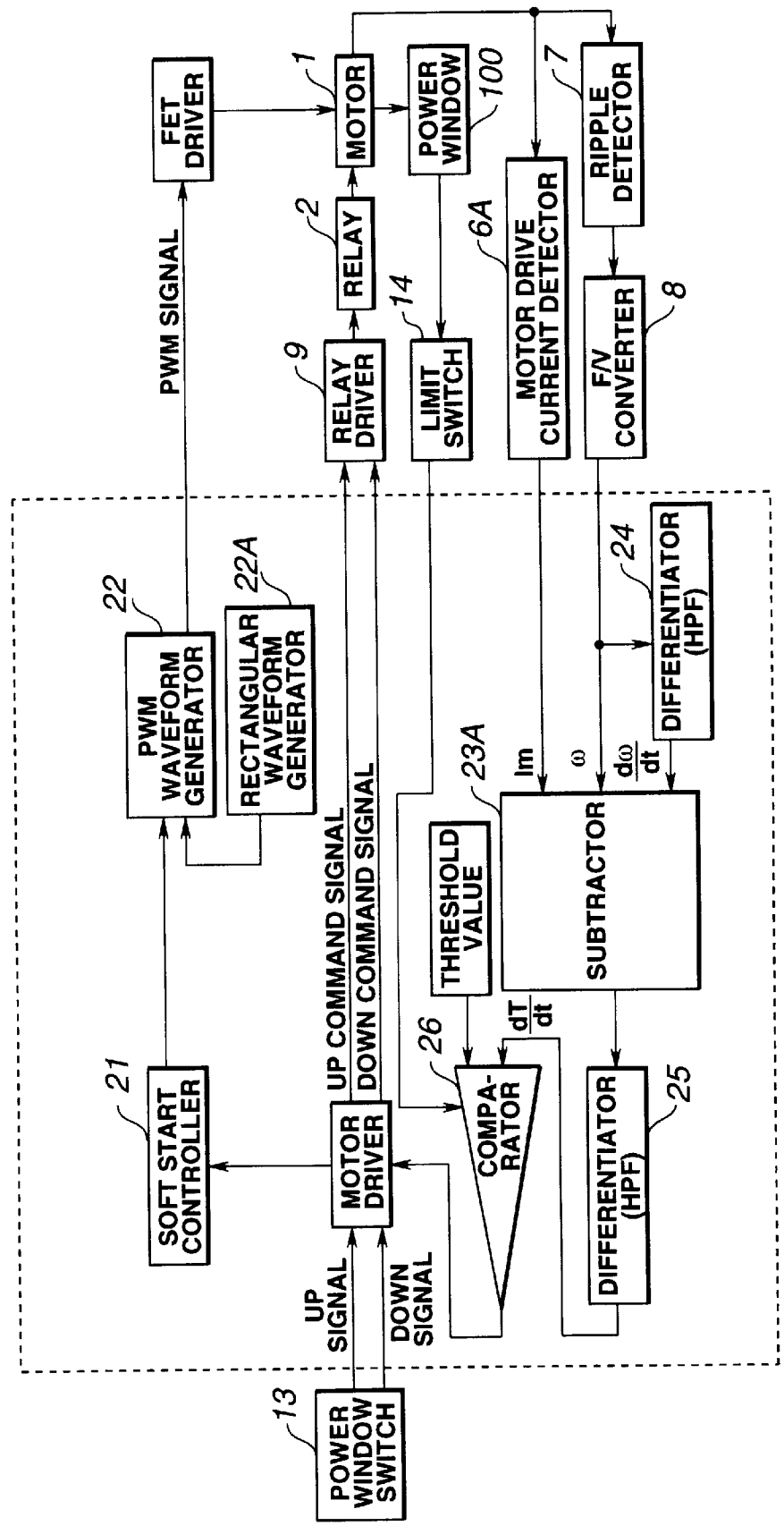
FIG. 12 is a functional block diagram of an alternative of the first embodiment shown in FIG. 3.

FIG. 12 shows an alternative of the first preferred embodiment of the apparatus for determining whether the foreign object or the like is caught in the power open-and closure mechanism such as the power window 100.

In this alternative, a motor drive current detector 6A detects the current flowing through the motor 1 and supplies the detected value of the motor current to the subtractor 23A. The subtractor 23A calculates the external disturbance torque T on the basis of the above-described equation (11). After the calculation of the external disturbance torque T, the same operation as described in the first embodiment is carried out in the single-chip microcomputer 11. The other structure and operation are the same as those in the first embodiment.

The present invention is applicable to a power sun roof installed on a ceiling part of a vehicular passenger compartment, an automatic door open-and-closure apparatus found in a super market store, a shutter open-and-closure apparatus found in a building, and so forth in addition to the power window shown in FIG. 2.

It is noted that the fixed member corresponds to the window frame 100A which may correspond to a pillar portion of the vehicular windshield and an sash portion of the vehicular door opening extended on a vehicular body.

It is noted that the term of detector or detecting means used in the claims includes a calculator, calculating means, a determinator, or determining means to interpret the term in its broadest sense.

It is noted that the power window is exemplified by a U.S. Pat. No. 5,669,181 issued on Sep. 23, 1997 (the disclosure of which is herein incorporated by reference).

It is also noted that the power window switch is exemplified by a U.S. Pat. No. 4,899,063 issued on Feb. 6, 1990(the disclosure of which is herein incorporated by reference).

It is finally noted that ω' is also expressed as dω/dt (dt denotes a differential quotient of time, or derivative of time), T' is also expressed as dT/dt, dT's/dt←Ts', and dTd'/dt←Td'.

What is claimed is:

1. An apparatus for a power open-and-closure mechanism, comprising:
   a fixed member of the power open-and-closure mechanism;
   a movable member of the power open-and-closure mechanism; a reversible motor for driving, in response to a receipt of a power supply, the power open-and-closure mechanism to move the movable member in directions toward the fixed member to a closed position and away from the fixed member to an open position;

a current detector for detecting a current flowing through the reversible motor;

a voltage detector for detecting a terminal voltage across the reversible motor;

a motor angular velocity detector for detecting an angular velocity of the reversible motor;

an external disturbance torque calculator for calculating an external disturbance torque imposed on the reversible motor on the basis of at least two of three parameters of the detected current flowing through the reversible motor, the detected terminal voltage across the reversible motor, and the detected angular velocity of the reversible motor;

a differentiator for differentiating the calculated external disturbance torque to derive a change rate at which the calculated external disturbance torque is changed with time; and, a comparator for comparing the derived change rate of the calculated external disturbance torque with a predetermined threshold value so as to determine whether a foreign object is caught in the power open-and-closure mechanism on the basis of a result of comparison thereby while the movable member is driven by the reversible motor to be moved in the direction toward the fixed member to the closed position.

2. An apparatus for a power open-and-closure mechanism as claimed in claim 1, which further comprises a motor driver for outputting a drive command signal to the reversible motor to command the reversible motor to drive the power open-and-closure mechanism to move the movable member in the direction so that a driving force of the reversible motor against the caught foreign object or the like via the movable member is reduced when the comparator determines that the derived change rate of the external disturbance torque is in excess of the predetermined threshold value and determines that the foreign object is caught in the power open-and-closure mechanism.

3. An apparatus for a power open-and-closure mechanism as claimed in claim 2, wherein the motor driver outputs the command signal to the motor so that a direction of a revolution of the motor is reversed so that the motor drives the power open-and-closure mechanism to move the movable member in the direction away from the fixed member to the open position by a predetermined distance when the comparator determines that the derived change rate of the external disturbance torque is in excess of the predetermined threshold value and determines that the foreign object is caught in the power open-and-closure mechanism.

4. An apparatus for a power open-and-closure mechanism as claimed in claim 3, which further comprises a soft start controller for outputting a motor current instruction value so as to control the current flowing through the reversible motor such that the current flowing through the reversible motor is increased at a relatively small rate of change from a predetermined small current value so as to prevent an occurrence of an inrush current flowing through the reversible motor when the movable member of the power open-and-closure mechanism is started to be moved in the direction toward the fixed member to the closed position.

5. An apparatus for a power open-and-closure mechanism as claimed in claim 4, which further comprises: a PWM waveform generator, in response to the motor current instruction value from the soft start controller, for generating and outputting a PWM signal having a pulse duty ratio of, at first, an approximately 0%, and, thereafter, the pulse duty ratio being increased at the relatively small rate of change and finally up to an approximately 100%; and an FET driver, in response to the PWM signal, for driving the reversible motor through which the current flowing through the reversible motor is caused to flow according to the pulse duty ratio of the PWM signal outputted from the PWM waveform generator.

6. An apparatus for a power open-and-closure mechanism as claimed in claim 5, wherein the soft start controller generates a target value of the current flowing through the reversible motor and outputs the current instruction value to the PWM waveform generator on the basis of the target value of the current flowing through the reversible motor and which further comprises a velocity feedback block for monitoring the detected angular velocity of the reversible motor and the target value of the current flowing through the reversible motor generated by the soft start controller and for outputting the current instruction value to the PWM waveform generator on the basis of the monitored angular velocity of the reversible motor and the monitored target value of the current flowing through the motor so that the angular velocity of the reversible motor is suppressed to be equal to or below a predetermined maximum value of the angular velocity of the reversible motor.

7. An apparatus for a power open-and-closure mechanism as claimed in claim 1, which further comprises a motor angular acceleration detector for detecting an angular acceleration of the reversible motor and wherein the external disturbance torque calculator calculates the external disturbance torque (T) as a function of the detected terminal voltage across the reversible motor, the detected angular velocity of the reversible motor, and the detected angular acceleration of the reversible motor.

8. An apparatus for a power open-and-closure mechanism as claimed in claim 7, wherein the predetermined threshold value is set on the basis of the detected angular velocity of the reversible motor.

9. An apparatus for a power open-and-closure mechanism as claimed in claim 8, wherein the predetermined threshold value (Kw) is set to be a predetermined large value when the angular velocity of the reversible motor is from zero to a certain constant value (a) and, thereafter, is increased in proportion to the angular velocity of the reversible motor.

10. An apparatus for a power open-and-closure mechanism as claimed in claim 7, which further comprises a relay having a first relay including a first magnetic relay coil which is energized so that one terminal of the reversible motor is connected to a plus terminal of the power supply via fixed and movable contacts of the first relay, the other terminal of the reversible motor being grounded via the driver, and a second relay including a second magnetic relay coil which is energized so that the other terminal of the reversible motor is, in turn, connected to the plus terminal of the power supply, the one terminal of the reversible motor being, in turn, grounded via the fixed and movable contacts thereof, and a relay driver, in response to the command signal from the motor driver, for energizing either one of the first or second magnetic relay coil and wherein the reversible motor is normally disconnected from the power supply via the first and second relays.

11. An apparatus for a power open-and-closure mechanism as claimed in claim 10, wherein a resistor is interposed between the relay and the driver and wherein the reversible motor angular velocity detector comprises a ripple detector for detecting a ripple pulse of the current flowing through the resistor and an F/V converter for converting a frequency of the ripple pulse into a corresponding voltage which corresponds to the angular velocity of the reversible motor.

12. An apparatus for a power open-and-closure mechanism as claimed in claim 11, wherein the reversible motor angular acceleration detector comprises another differentiator for differentiating the detected angular velocity of the reversible motor.

13. An apparatus for a power open-and-closure mechanism as claimed in claim 12, wherein the external disturbance torque calculator comprises a subtractor for subtracting the detected angular velocity of the reversible motor and the detected angular acceleration of the reversible motor from the detected terminal voltage of the reversible motor.

14. An apparatus for a power open-and-closure mechanism as claimed in claim 7, wherein the external disturbance torque calculator calculates the external disturbance torque T as follows:

$$T = Em \times K1/Z - [(K1 \times K1/Z) + K2] \times \omega - M \times d\omega/dt,$$

wherein Em denotes the terminal voltage of the reversible motor, K1 denotes a motor constant, Z denotes a motor impedance, K2 denotes a viscosity resistance coefficient, ω denotes the motor angular velocity, M denotes an inertia moment of a whole drive system of the apparatus for the power open-and-closure mechanism, and M×dω/dt denotes an inertia moment of the reversible motor.

15. An apparatus for a power open-and-closure mechanism as claimed in claim 14, wherein the external disturbance torque calculator comprises: a first amplifier for amplifying the detected terminal voltage of the reversible motor with a gain (G) corresponding to K1/Z; a second amplifier for amplifying the detected angular velocity of the reversible motor with a gain (G) corresponding to [(K1× K1/Z)+K2]; a first high pass filter for differentiating the detected angular velocity of the reversible motor to derive the angular acceleration of the reversible motor; a third amplifier for amplifying the reversible motor angular acceleration with a gain (G) corresponding to M; and a differential amplifier for subtracting the amplified reversible motor angular velocity and the amplified reversible motor angular acceleration from the amplified terminal voltage across the reversible motor and wherein the differentiator for differentiating an output voltage of the differential amplifier comprises a second high pass filter for deriving the change rate (dT/dt) of the external disturbance torque (T) derived by the differential amplifier.

16. An apparatus for a power open-and-closure mechanism as claimed in claim 15, wherein the comparator compares the differentiated value outputted from the second high pass filter with the predetermined threshold value and outputs a determination signal to a control logic circuit when the differentiated value (dT/dt) is in excess of the predetermined threshold value, the control logic circuit corresponding to the motor driver.

17. An apparatus for a power open-and-closure mechanism as claimed in claim 1, which further comprises an angular acceleration detector for detecting an angular acceleration of the reversible motor and wherein the external disturbance torque calculator calculates the external disturbance torque (T) as follows:

T=Im×K1−K2×ω−M×dω/dt, wherein Im denotes the current flowing through the reversible motor, K1 denotes a motor constant, K2 denotes a viscosity resistance coefficient, ω denotes the reversible motor angular velocity, M denotes an inertia moment of a whole drive system of the apparatus for the power open-and-closure mechanism, and M×dω/dt denotes an inertia moment of the reversible motor.

18. An apparatus for a power open-and-closure mechanism as claimed in claim 11, wherein the open-and-closure mechanism is a power window of an automotive vehicular door, the fixed member comprises a window frame and the movable member comprises a window pane and the reversible motor is a DC motor and which further comprises: a power window switch for outputting an UP signal to the motor driver, the motor driver outputting the corresponding command signal to the first relay via the relay driver to energize the first magnetic relay coil so that the motor is connected to the power supply to drive the power window to move the window pane in an upward direction toward the window frame to the closed position, and for outputting a DOWN signal to the motor driver, the motor driver outputting the corresponding command signal to the second relay via the relay driver to energize the second magnetic relay coil so that the motor is connected to the power supply to drive the power window to move the window pane in a downward direction away from the window frame to the open position; a limit switch for outputting an upper limit signal when the window pane is moved in the upward direction toward the window frame to a completely closed position, the upper limit signal being outputted to the comparator so that the comparison of the derived change rate (dT/dt) of the external disturbance torque with the predetermined threshold value is disabled; and a reverse flow blocking diode for blocking a reverse current flow of the power supply into a control circuitry constituting the motor driver, the soft start controller, the PWM waveform generator, the comparator, the differentiator, the other differentiator, and the subtractor when a user of the apparatus erroneously connect the plus terminal of the power supply to a minus terminal of the control circuitry and vice versa.

19. An apparatus for a power open-and-closure mechanism, comprising:

a fixed member;

a movable member;

a reversible motor for driving the movable member toward the fixed member and to a closed position;

external disturbance torque calculating means for calculating an external disturbance torque and imposed on the reversible motor on the basis of at least two of three parameters of a detected current flowing through the reversible motor, a detected terminal voltage across the reversible motor, and a detected angular velocity of the reversible motor;

differentiating means for differentiating the calculated external disturbance torque to derive a change rate at which the calculated external disturbance torque is changed with time; and, comparing means for comparing the derived change rate of the calculated external disturbance torque with a predetermined threshold value; and a determining unit which determines whether a foreign object is caught in the power open-and-closure mechanism on the basis of a result of a comparison performed by the comparing means while the movable member is driven by the reversible motor toward the closed position.

20. A method for determining whether a foreign object is caught in a power open-and-closure mechanism, the open-and-closure mechanism including a fixed member, a movable member, and a motor for driving in response to a receipt of a power supply, the power open-and-closure mechanism to move the movable member in directions toward the fixed member to a closed position and away from the fixed member to an open position, the method comprising the steps of:
- detecting a current flowing through the reversible motor;
- detecting a terminal voltage across the reversible motor;
- detecting an angular velocity of the motor;
- calculating an external disturbance torque imposed on the motor on the basis of at least two of three parameters of the detected current flowing through the motor, the detected terminal voltage across the motor, and the detected angular velocity of the motor;
- differentiating the calculated external disturbance torque to derive a change rate at which the calculated external disturbance torque is changed with time;
- comparing the derived change rate of the calculated external disturbance torque with a predetermined threshold value; and
- determining whether the foreign object is caught in the power open-and-closure mechanism on the basis of a result of comparison at the comparing step while the movable member is driven by the motor to be moved in the direction toward the fixed member to the closed position.

* * * * *